(12) United States Patent
Moon et al.

(10) Patent No.: US 11,875,593 B2
(45) Date of Patent: Jan. 16, 2024

(54) DISPLAY DEVICE AND FINGERPRINT DETECTION METHOD USING THE SAME

(71) Applicant: SAMSUNG DISPLAY CO., LTD., Yongin-si (KR)

(72) Inventors: Seung Hyun Moon, Yongin-si (KR); Dong Wook Yang, Yongin-si (KR); Go Eun Cha, Yongin-si (KR); Kyung Tea Park, Yongin-si (KR); Kang Bin Jo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 126 days.

(21) Appl. No.: 17/338,002

(22) Filed: Jun. 3, 2021

(65) Prior Publication Data
US 2022/0058363 A1    Feb. 24, 2022

(30) Foreign Application Priority Data
Aug. 19, 2020  (KR) .................. 10-2020-0104207

(51) Int. Cl.
*G06V 40/13*   (2022.01)
*G06T 7/80*    (2017.01)
(Continued)

(52) U.S. Cl.
CPC ........ *G06V 40/1318* (2022.01); *G06F 3/0446* (2019.05); *G06F 18/22* (2023.01);
(Continued)

(58) Field of Classification Search
None
See application file for complete search history.

(56) References Cited

U.S. PATENT DOCUMENTS 9,864,893 B2    1/2018 Kim et al.
2011/0057893 A1   3/2011 Kim et al.
(Continued)

FOREIGN PATENT DOCUMENTS

CN    108874208 A  * 11/2018
CN    110163150 A  *  8/2019  ........... G06K 9/0004
(Continued)

OTHER PUBLICATIONS

Extended European Search Report dated Jan. 31, 2022 in related European Patent Application No. 21192022.8.

*Primary Examiner* — Benjamin X Casarez
(74) *Attorney, Agent, or Firm* — F. Chau & Associates, LLC

(57) ABSTRACT

A display device includes a display panel including a pinhole optical system and an optical sensor overlapping the pinhole optical system. A fingerprint detection method which detects a user's fingerprint using the display device includes obtaining fingerprint sensing data by sensing a user's fingerprint using the display device, detecting misalignment information indicating a degree of misalignment between the pinhole optical system and the optical sensor, generating calibration data using at least one piece of reference data corresponding to at least one reference folding angle according to the detected misalignment information, generating fingerprint data by correcting the fingerprint sensing data using the calibration data, and detecting the user's fingerprint according to the fingerprint data.

20 Claims, 20 Drawing Sheets

(51) Int. Cl.
  *G06T 7/70* (2017.01)
  *G06F 3/044* (2006.01)
  *G06F 18/22* (2023.01)

(52) U.S. Cl.
  CPC ............... *G06T 7/70* (2017.01); *G06T 7/80* (2017.01); *G06F 2203/04102* (2013.01)

(56) References Cited

U.S. PATENT DOCUMENTS

| | | | |
|---|---|---|---|
| 2018/0012069 A1* | 1/2018 | Chung | G06V 40/1365 |
| 2018/0204884 A1* | 7/2018 | Isa | H01L 27/3279 |
| 2019/0266379 A1* | 8/2019 | Huang | G09F 9/33 |
| 2020/0143135 A1* | 5/2020 | Kim | G06V 10/30 |
| 2020/0380893 A1* | 12/2020 | Park | G09F 9/301 |
| 2021/0157431 A1* | 5/2021 | Gu | G06F 1/1652 |
| 2021/0335172 A1* | 10/2021 | Han | H01L 27/3234 |
| 2022/0343670 A1* | 10/2022 | Husth | G06V 10/24 |

FOREIGN PATENT DOCUMENTS

| | | |
|---|---|---|
| KR | 10-1082293 | 11/2011 |
| KR | 10-1376227 | 3/2014 |
| KR | 10-1691155 | 1/2017 |
| KR | 1020200050515 | 5/2020 |
| WO | 2020019620 | 1/2020 |
| WO | 2020211062 | 10/2020 |

* cited by examiner

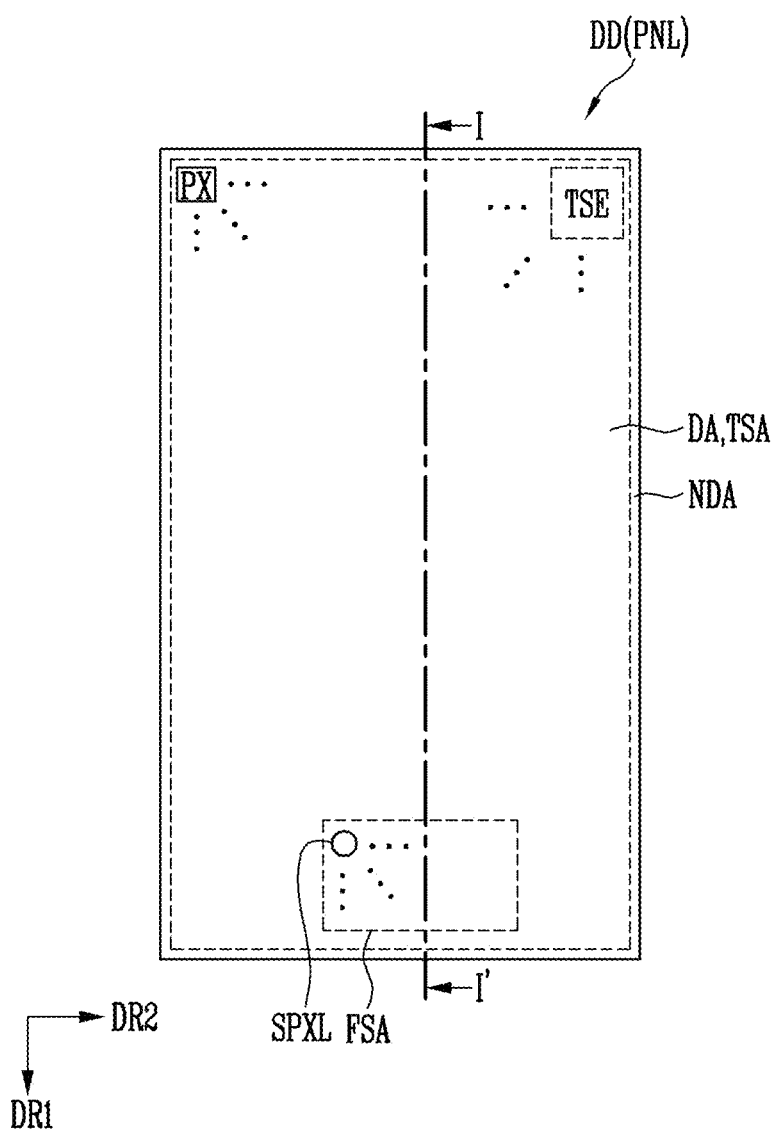

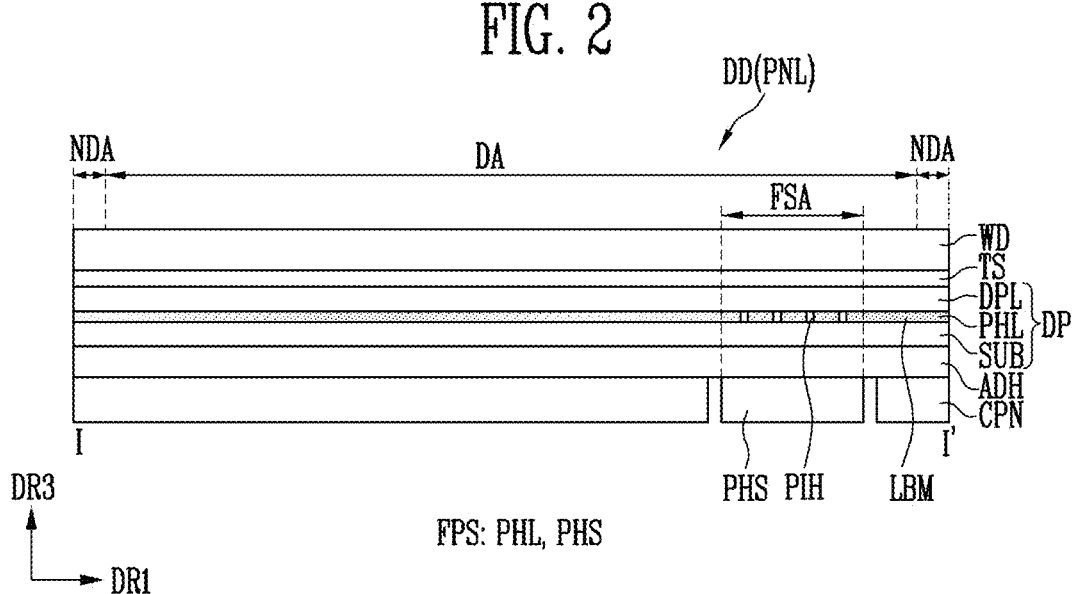
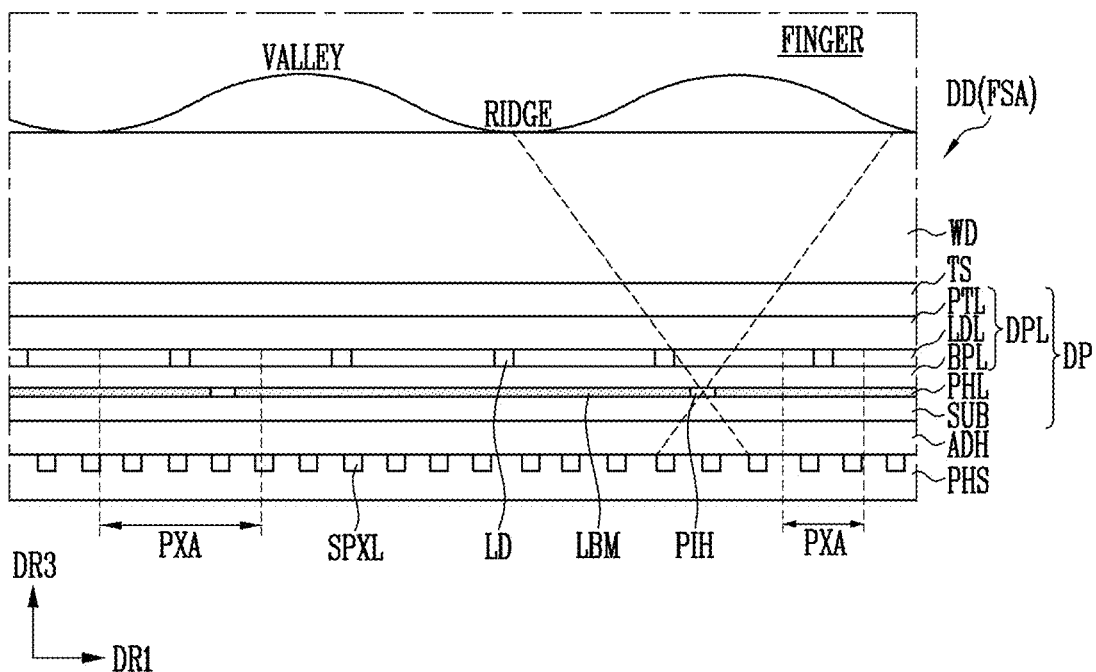

Cal_0°

Cal_60°

Cal_120°

Cal_180°

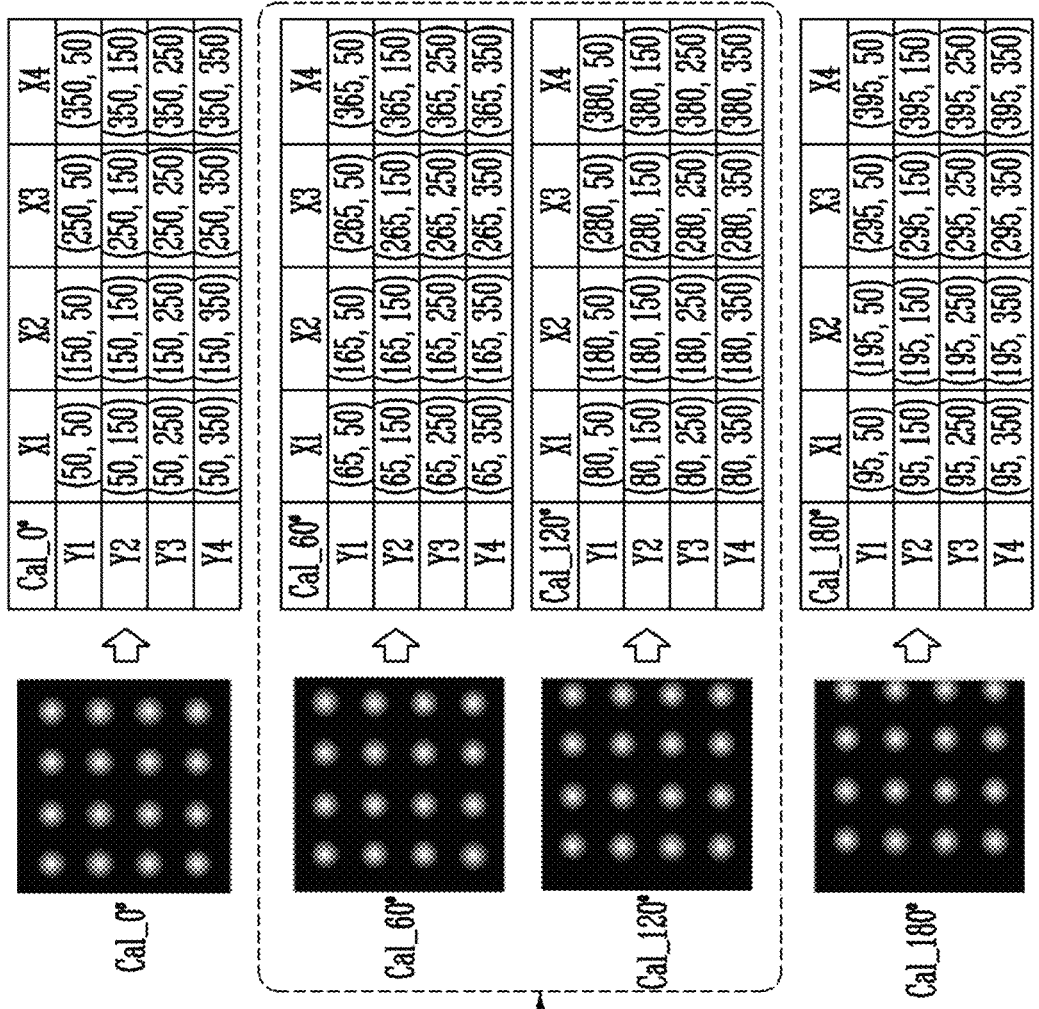
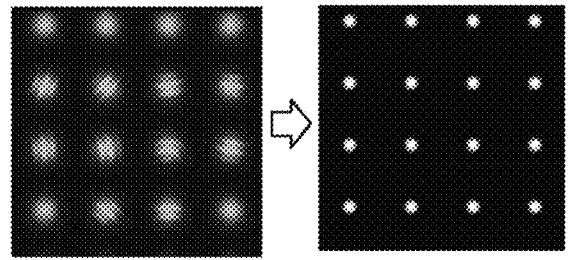
FIG. 21A
FIG. 21B

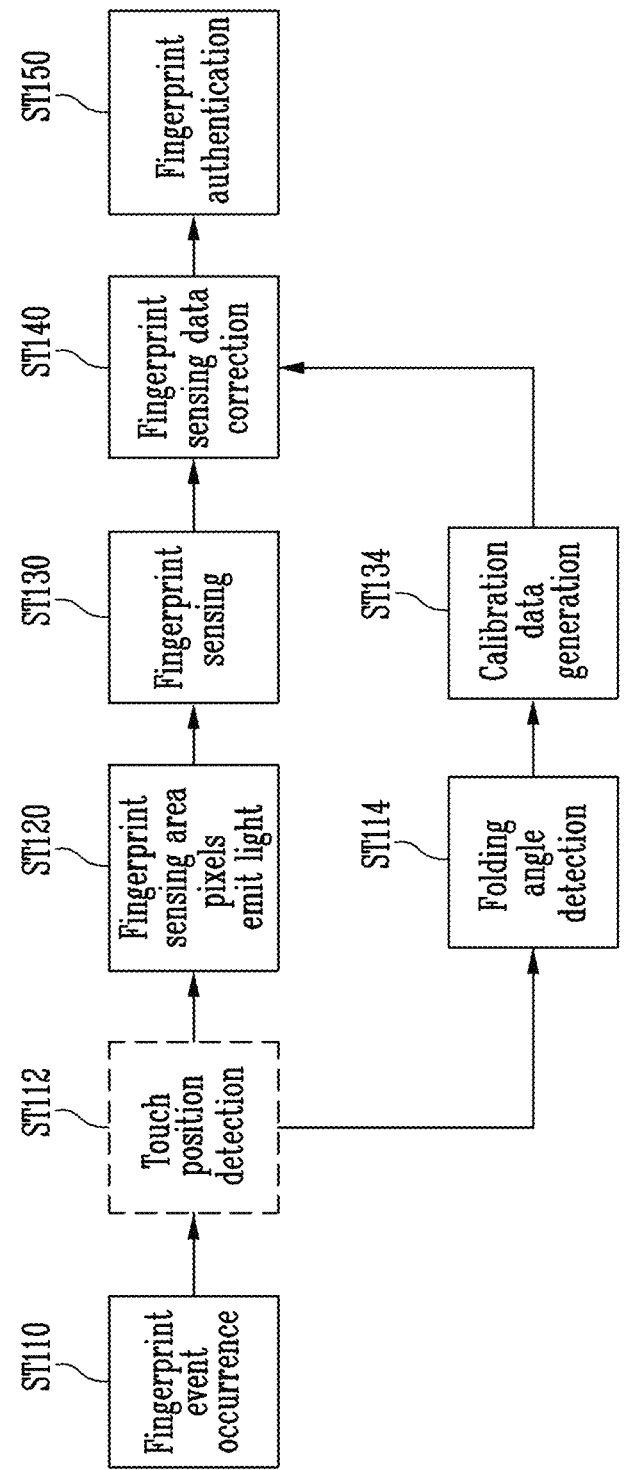

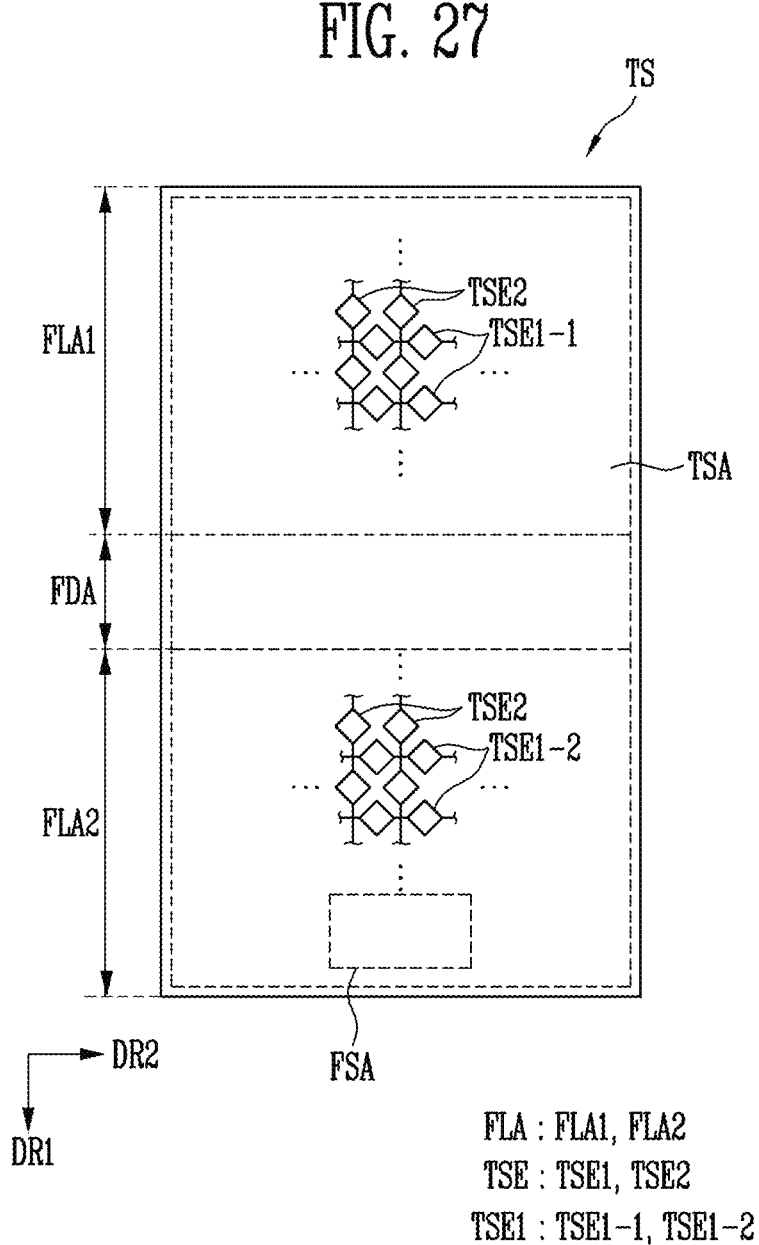

FIG. 29

| Folding angle | Calibration data |
|---|---|
| 0°~20° | Cal_0° |
| 20°~45° | Cal_30° |
| 45°~70° | Cal_60° |
| 70°~90° | Cal_90° |

FIG. 30

| Folding angle | Offset value |
|---|---|
| 45° | 40μm |
| 90° | 80μm |
| 135° | 120μm |
| 180° | 160μm |

DISPLAY DEVICE AND FINGERPRINT DETECTION METHOD USING THE SAME

CROSS-REFERENCE TO RELATED APPLICATIONS

This application claims priority under 35 U.S.C. § 119 to Korean Patent Application No. 10-2020-0104207 filed in the Korean Intellectual Property Office on Aug. 19, 2020, the disclosure of which is incorporated by reference herein in its entirety.

TECHNICAL FIELD

The present invention relates to a display device and a fingerprint detection method using the same.

DISCUSSION OF RELATED ART

A biometric information authentication method using a user's fingerprint may be utilized in a display device such as, for example, a smartphone or tablet PC. To implement the biometric information authentication method, a fingerprint sensor may be embedded in the display device.

SUMMARY

An embodiment of the present invention provides a display device including a pinhole optical system and an optical sensor, and a fingerprint detection method using the same.

According to an embodiment of the present invention, a fingerprint detection method includes obtaining fingerprint sensing data by sensing a user's fingerprint using a display device including a display panel including a pinhole optical system and an optical sensor overlapping the pinhole optical system, detecting misalignment information indicating a degree of misalignment between the pinhole optical system and the optical sensor, generating calibration data using at least one piece of reference data corresponding to at least one reference folding angle according to the detected misalignment information, generating fingerprint data by correcting the fingerprint sensing data using the calibration data, and detecting the user's fingerprint according to the fingerprint data.

In an embodiment, detecting the misalignment information includes detecting position information of a plurality of pinholes included in the pinhole optical system using the fingerprint sensing data, and detecting a difference in a movement amount between the pinhole optical system and the optical sensor by comparing the position information of the pinholes with the at least one piece of reference data.

In an embodiment, generating the calibration data includes selecting two pieces of reference data having a high degree of similarity from a plurality of pieces of reference data by comparing the position information of the pinholes with the plurality of pieces of reference data, and generating the calibration data by interpolating the two pieces of reference data.

In an embodiment, interpolating the two pieces of reference data includes setting an offset value for each of the two pieces of reference data by comparing the position information of the pinholes with extracted position information of the pinholes extracted from the two pieces of reference data, assigning a weight to each of the two pieces of reference data according to an offset value for each of the two pieces of reference data, and summing the two weighted pieces of reference data.

In an embodiment, the offset value for each of the two pieces of reference data is a correction value set to match positions of the pinholes in each of the two pieces of reference data with detected positions of the pinholes.

In an embodiment, generating the calibration data includes setting an offset value for a single piece of reference data by comparing the position information of the pinholes with extracted position information of pinholes extracted from the single piece of reference data, and generating the calibration data by correcting the single piece of reference data according to the offset value.

In an embodiment, the offset value is a correction value set to match positions of the pinholes in the single piece of reference data with detected positions of the pinholes.

In an embodiment, detecting the misalignment information includes detecting a folding angle of the display device.

In an embodiment, detecting the folding angle of the display device includes detecting the folding angle using a sensing signal output from a touch sensor.

In an embodiment, generating the calibration data includes selecting one piece of reference data as the calibration data corresponding to the detected folding angle.

In an embodiment, generating the calibration data includes selecting two pieces of reference data corresponding to two reference folding angles similar to the detected folding angle, and generating the calibration data by interpolating the two pieces of reference data.

In an embodiment, generating the calibration data includes extracting an offset value corresponding to the detected folding angle, and generating the calibration data by correcting the at least one piece of reference data according to the offset value.

In an embodiment, generating the calibration data includes interpolating two offset values for two reference folding angles similar to the detected folding angle, and generating the calibration data by correcting the at least one piece of reference data according to the interpolated two offset values.

According to an embodiment of the present invention, a display device includes a display panel including a pinhole optical system, an optical sensor overlapping the pinhole optical system, a memory that stores at least one piece of reference data corresponding to at least one reference folding angle, and a sensor controller that detects misalignment information indicating a degree of misalignment between the pinhole optical system and the optical sensor, and that corrects fingerprint sensing data according to the detected misalignment information and the at least one piece of reference data.

In an embodiment, the sensor controller includes a fingerprint sensing data generator that generates the fingerprint sensing data using electrical signals from the optical sensor, a movement amount detector that detects the misalignment information, a calculator that generates calibration data corresponding to the detected misalignment information, and an image processor that corrects the fingerprint sensing data using the calibration data.

In an embodiment, the calculator selects at least one piece of reference data stored in the memory corresponding to the detected misalignment information, and generates the calibration data using the selected at least one piece of reference data.

In an embodiment, the calculator generates the calibration data by correcting at least one piece of reference data stored in the memory according to an offset value corresponding to the detected misalignment information.

In an embodiment, the display panel includes a folding area having flexibility, and a first flat area and a second flat area disposed on opposite sides of the folding area.

In an embodiment, the display device further includes a touch sensor including at least one touch electrode disposed in the first flat area and at least one touch electrode disposed in the second flat area.

In an embodiment, the display device further includes a folding angle detector that detects a folding angle from an output signal of the touch sensor. The sensor controller corrects the fingerprint sensing data according to the detected folding angle.

According to a display device according to embodiments of the present invention and a fingerprint detection method using the same, in a display device which detects a fingerprint using a pinhole optical system embedded in a display panel, even when the alignment between the pinhole optical system and the optical sensor is misaligned due to, for example, folding or bending, the signal-to-noise ratio (SNR) can be improved and fingerprints can be detected with high accuracy. Accordingly, fingerprint authentication performance of the display device can be improved.

BRIEF DESCRIPTION OF THE DRAWINGS

The above and other features of the present invention will become more apparent by describing in detail embodiments thereof with reference to the accompanying drawings, in which:

FIG. 1 is a plan view illustrating a display device according to an embodiment of the present invention.

FIG. 2 is a cross-sectional view taken along line I-I' of FIG. 1.

FIG. 3 is an enlarged cross-sectional view illustrating a fingerprint sensing area of the display device illustrated in FIGS. 1 and 2.

FIGS. 21A and 21B illustrate a method of selecting reference data according to an embodiment of the present invention.

FIG. 26 is a block diagram illustrating a fingerprint detection and authentication method according to an embodiment of the present invention.

FIG. 27 is a plan view illustrating a touch sensor according to an embodiment of the present invention.

FIG. 29 illustrates a method of selecting calibration data according to an embodiment of the present invention.

FIG. 30 illustrates a method of setting an offset value of calibration data according to an embodiment of the present invention.

DETAILED DESCRIPTION

Figure 4:
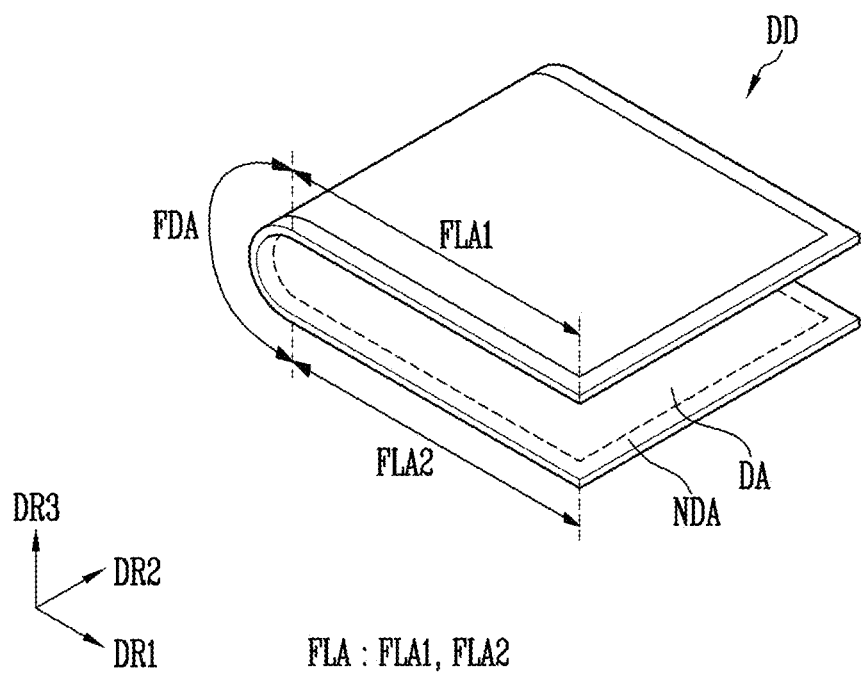
FIG. 4 is a perspective view schematically illustrating a display device according to an embodiment of the present invention.

Embodiments of the present invention will be described more fully hereinafter with reference to the accompanying drawings. Like reference numerals may refer to like elements throughout the accompanying drawings.

It should be understood that the terms "first," "second," "third," etc. are used herein to distinguish one element from another, and the elements are not limited by these terms. Thus, a "first" element in an embodiment may be described as a "second" element in another embodiment. The terms of a singular form may include plural forms unless the context clearly indicates otherwise.

It should be understood that descriptions of features or aspects within each embodiment should typically be considered as available for other similar features or aspects in other embodiments, unless the context clearly indicates otherwise.

When one value is described as being about the same as or about equal to another value, it is to be understood that the values are equal to each other to within a measurement error, or if measurably unequal, are close enough in value to be functionally equal to each other as would be understood by a person having ordinary skill in the art. It will be further understood that when two components or directions are described as extending substantially parallel or perpendicular to each other, the two components or directions extend exactly parallel or perpendicular to each other, or extend approximately parallel or perpendicular to each other as would be understood by a person having ordinary skill in the art (e.g., within a measurement error). Other uses of the terms "substantially" and "about" should be interpreted in a like fashion.

FIG. 1 is a plan view illustrating a display device DD according to an embodiment of the present invention. FIG. 2 is a cross-sectional view taken along line I-I' of FIG. 1. For example, FIGS. 1 and 2 schematically illustrate a structure of a display device DD with focus on the panel unit PNL.

Referring to FIGS. 1 and 2, the display device DD includes a display panel DP including pixels PX (also referred to as "display pixels") provided in a display area DA to display an image, and a window WD for protecting the display panel DP.

In addition, the display device DD may include at least one type of sensor to provide various functions. For example, the display device DD may include a touch sensor TS including touch electrodes TSE provided in a touch sensing area TSA, and an optical sensor PHS including sensor pixels SPXL provided in a fingerprint sensing area FSA.

In an embodiment, the touch sensing area TSA and the fingerprint sensing area FSA may overlap the display area DA. For example, an entire area of the display area DA may be set as the touch sensing area TSA, and a partial area of the display area DA may be set as the fingerprint sensing area FSA. However, the present invention is not limited thereto. For example, a position and/or size of the touch sensing area TSA and the fingerprint sensing area FSA may be variously changed according to embodiments of the present invention.

Additionally, the display device DD may further include a cover panel CPN provided on a rear surface of the display panel DP. The cover panel CPN may increase device strength. In an embodiment, the optical sensor PHS may be provided on the rear surface of the display panel DP to be disposed around the cover panel CPN. For example, the cover panel CPN may include an opening corresponding to the fingerprint sensing area FSA, and an optical sensor PHS may be disposed in the opening. In this case, the thickness of the display device DD can be reduced and the flexibility thereof can be secured. The present invention, however, is not limited thereto. For example, in an embodiment, at least a portion of the optical sensor PHS may be disposed in the opening of the cover panel CPN, or the optical sensor PHS may be arranged without being disposed in the opening.

The display device DD may have various shapes. For example, the display device DD may have a rectangular shape in which a length in a first direction DR1 is greater than a length in a second direction DR2. In addition, the display device DD may have various shapes. For example, the display device DD may have various shapes such as a closed polygon including a side of a straight line, a circle or an ellipse including a side of a curved line, a semicircle or a semi-ellipse including a side of a straight line and a curved line, etc. Also, the display device DD may have an angled corner or a curved corner.

The display device DD may have flexibility in an entire area or at least a portion of the area. In an embodiment, at least one area of the display device DD may be set as a deformation area (e.g., folding area). The display device DD may be, for example, folded or rolled in the deformation area. For example, the display device DD may be a foldable display device.

The display panel DP may have a shape matching the shape of the display device DD. For example, the display panel DP may have a rectangular shape or various other shapes.

The display panel DP may display arbitrary visual information on a front side thereof including, for example, text, video, a photo, a 2D or 3D image, etc. In the present invention, the type and/or structure of the display panel DP is not particularly limited.

In an embodiment, the display panel DP may be a light-emitting display panel including a light-emitting element. For example, the display panel DP may be a light-emitting display panel using an organic light-emitting diode or an ultra-small inorganic light-emitting diode, which may be on the nano to micro scale, as a light source of each pixel. In addition, the display panel DP may be made of other types of display panels.

The display panel DP and the display device DD including the same may include a display area DA in which an image is displayed and a non-display area NDA disposed around the display area DA. For example, the non-display area NDA may surround the display area DA.

The pixels PX may be provided in the display area DA. Lines, pads, and/or at least one driving circuit (e.g., at least one of a gate driver and a data driver) for driving the pixels PX of the display area DA may be provided in the non-display area NDA.

The display panel DP may include a substrate SUB and a display pixel layer DPL provided on the substrate SUB. Also, the display panel DP may further include a pinhole layer PHL. For example, the display panel DP may include a pinhole layer PHL disposed between the substrate SUB and the display pixel layer DPL. However, the position of the pinhole layer PHL is not limited thereto, and may be changed according to embodiments of the present invention. For example, in an embodiment, the pinhole layer PHL may be provided inside the display pixel layer DPI (e.g., a circuit element layer and/or a light-emitting element layer), or may be provided in the display pixel layer DPI. In an embodiment, the pinhole layer PHL may be disposed under the substrate SUB.

The substrate SUB may be made of various materials such as, for example, glass or a polymer organic material. In an embodiment, when the display device DD is a foldable display device, the substrate SUB may be formed of an insulating substrate made of a polymer organic material. The insulating substrate including the polymer organic material may include at least one of, for example, polystyrene, polyvinyl alcohol, polymethyl methacrylate, polyethersulfone, polyacrylate, polyether imide, polyetherimide, polyethylene naphthalate, polyethylene terephthalate, polyphenylene sulfide, polyarylate, polyimide, polycarbonate, triacetate cellulose, cellulose acetate propionate, and the like. However, the material of the substrate SUB is not limited thereto. For example, in an embodiment, the substrate SUB may be made of fiber glass reinforced plastic (FRP).

The pinhole layer PHL may include a plurality of pinholes PIH provided in the fingerprint sensing area FSA, and a light blocking member LBM surrounding the pinholes PIH. The light blocking member LBM may be made of a material capable of blocking light, including, for example, a conventional black matrix material or metal, and the constituent material thereof is not particularly limited. The pinholes PIH may be openings formed with a predetermined distance and/or size in the light blocking member LBM at least in the fingerprint sensing area FSA. Accordingly, only some of light passing through the pinholes PIH among light incident on the pinhole layer PHL may be incident on the optical sensor PHS.

The pinhole layer PHL may constitute a pinhole optical system for sensing the fingerprint. For example, the pinhole layer PHL may constitute a fingerprint sensor FPS together with the optical sensor PHS. In an embodiment, the fingerprint sensor FPS may further include an infrared (IR) filter.

The display pixel layer DPL may include pixels PX for displaying an image, and various circuit elements and/or lines connected to the pixels PX. In an embodiment, each pixel PX may include at least one light-emitting element and a pixel circuit for driving the light-emitting element. In this case, the display pixel layer DPL may include a circuit element layer (also referred to as a "backplane") including a pixel circuit of each pixel PX and lines connected thereto, and a light-emitting element layer overlapping the circuit element layer.

The touch sensor TS may be provided on one surface of the display panel DP. For example, the touch sensor TS may be provided on the display panel DP in a third direction DR3 (e.g., in a height direction). However, the position of the touch sensor TS is not limited thereto, and may be changed according to embodiments of the present invention. For example, in an embodiment, the touch sensor TS may be disposed under the display panel DP, or may be disposed on both sides of the display panel DP. In an embodiment, the touch sensor TS may be provided inside the display panel DP.

In an embodiment, the touch sensor TS may be provided integrally with the display panel DP. For example, the touch sensor TS may be directly formed on the display pixel layer DPL (or a thin film encapsulation layer covering the display pixel layer DPL) of the display panel DP. In an embodiment, the touch sensor TS may be manufactured separately from the display panel DP, and then may be attached to the display panel DP by, for example, an adhesive member.

In an embodiment, the touch sensor TS may be a capacitive touch sensor. For example, the touch sensor TS may be a self-capacitive type or mutual-capacitive type touch sensor including a plurality of touch electrodes TSE dispersed in the touch sensing area TSA. However, the type and structure of the touch sensor TS is not limited thereto, and may be variously changed according to embodiments of the present invention.

The window WD may be provided on the front surface of the display panel DP to protect the display panel DP. For example, the window WD may be disposed on the display panel DP and the touch sensor TS in the third direction DR3.

The window WD may mitigate an external impact, thereby preventing damage or malfunction of the display panel DP and/or the touch sensor TS. The external impact may refer to a force that can cause a defect in the display panel DP and/or the touch sensor TS. Such a force may include, for example, pressure or stress applied to the display panel DP from an external source.

In an embodiment, when the display device DD is a display device capable of being deformed such as a foldable display device, the window WD may have flexibility in the entire area or at least a portion of the area. To this end, the window WD may be formed of an insulating material having flexibility.

The cover panel CPN and the optical sensor PHS are provided on the rear surface of the display panel DP, and may be coupled to the display panel DP by an adhesive member ADH. For example, the cover panel CPN and the optical sensor PHS may be disposed under the display panel DP in the third direction DR3.

The cover panel CPN may include a cushion layer that functions to mitigate the external impact and includes a material capable of elastic deformation. For example, the cover panel CPN may include a single layered or a multi-layered cushion layer including at least one of, for example, thermoplastic elastomer, polystyrene, polyolefins, polyurethane thermoplastic elastomer, polyamides, synthetic rubber, polydimethylsiloxane, polybutadiene, polyisobutylene, poly (styrene-butadienestyrene), polyurethane, polychloroprene, polyethylene, silicone, and a combination thereof. In addition, the cover panel CPN may be formed of various materials having elasticity. In addition, the cover panel CPN may further include, for example, a high-strength plate (e.g., a metal plate), graphite, a copper plate, and/or a heat dissipation plate for stably supporting the display panel DP on the rear surface of the display panel DP. That is, the cover panel CPN may be referred to when including at least one of configurations described above.

The optical sensor PHS may include a plurality of sensor pixels SPXL dispersed in the fingerprint sensing area FSA. In an embodiment, the optical sensor PHS may sense a user's fingerprint using light generated from the display panel DP. For example, the optical sensor PHS can sense reflected light that is emitted from at least some pixels PX disposed in the fingerprint sensing area FSA and is reflected from the user's finger (e.g., a fingerprint area), thereby sensing the user's fingerprint.

FIG. 3 is an enlarged cross-sectional view illustrating a fingerprint sensing area FSA of the display device DD illustrated in FIGS. 1 and 2. For example, FIG. 3 schematically illustrates a cross section of a fingerprint sensing area FSA and one area of a user's finger making contact thereon.

Referring to FIGS. 1 to 3, the display pixel layer DPL may include a circuit element layer BPL and a light-emitting element layer LDL sequentially disposed on the substrate SUB and the pinhole layer PHL. In addition, the display pixel layer DPL may further include a protective layer PTL disposed on the light-emitting element layer LDL.

The circuit element layer BPL may include at least one conductive layer. For example, the circuit element layer BPL may include a plurality of circuit elements for constituting the pixel circuit of the pixels PX, and lines for supplying various powers and signals for driving the pixels PX. In this case, the circuit element layer BPL may include a plurality of conductive layers for constituting various circuit elements such as, for example, transistors, capacitors and lines connected thereto. Also, the circuit element layer BPL may include at least one insulating layer provided between the plurality of conductive layers.

The light-emitting element layer LDL may be disposed on one surface of the circuit element layer BPL. The light-emitting element layer LDL may include a plurality of light-emitting elements LD connected to circuit elements and/or lines of the circuit element layer BPL through, for example, a contact hole. In an embodiment, each light-emitting element LD may be composed of an organic light-emitting diode, or may be composed of an ultra-small inorganic light-emitting diode such as a micro or nano light-emitting diode or a quantum dot light-emitting diode.

Each pixel PX may include circuit elements disposed on the circuit element layer BPL and at least one light-emitting element LD disposed on the light-emitting element layer LDL. In an embodiment, each pixel PX may include a single light-emitting element, or may include a plurality of light-emitting elements connected to each other in series, parallel, or series and parallel. In this case, at least one light-emitting element LD may be formed and/or provided in each pixel area PXA.

The protective layer PTL may be disposed on the light-emitting element layer LDL and may cover the display area DA. The protective layer PTL may include a sealing member such as, for example, a thin film encapsulation (TFE) or an encapsulation substrate. In addition, the protective layer (PTL) may further include a protective film.

The optical sensor PHS may overlap the display panel DP to be disposed at least in the fingerprint sensing area FSA. The optical sensor PHS may include sensor pixels SPXL dispersed with a predetermined resolution and/or gap.

The sensor pixels SPXL may have an appropriate number, size, and arrangement to generate a fingerprint image capable of being identifiable from electrical signals output from the sensor pixels SPXL. For example, the gap between the sensor pixels SPXL may be densely set so that reflected light reflected from a target object (e.g., a finger) can be incident on at least two adjacent sensor pixels SPXL.

The sensor pixels SPXL may output an electrical signal, for example, a voltage signal according to the amount of light received. The reflected light, which is reflected from the user's finger (e.g., the fingerprint area), passes through the pinhole layer PHL, and is incident on the sensor pixels SPXL, may have optical characteristics (e.g., frequency, wavelength, intensity, etc.) corresponding to valleys and ridges of the fingerprint formed on the user's finger. Accordingly, the sensor pixels SPXL may output sensing signals having electrical characteristics according to optical characteristics of reflected light.

The width (or diameter) of the pinholes PIH may be set to be about 10 times or more the wavelength of the reflected light, for example, about 4 μm or about 5 μm or more so as to prevent diffraction of light. Also, the width of the pinholes PIH may be set to a size sufficient to prevent image blur and to more clearly sense the shape of the fingerprint. For example, the width of the pinholes PIH may be set to about 15 μm or less. However, the width of the pinholes PIH is not limited thereto, and may change according to the wavelength band of the reflected light and/or the thickness of each layer of a module.

Only reflected light passing through the pinholes PIH may reach the sensor pixels SPXL of the optical sensor PHS. Due to the pinhole PIH having a very narrow width, the phase of light reflected from the fingerprint and the phase of an image focused on the optical sensor PHS may have a difference of 180 degrees.

Figure 5:
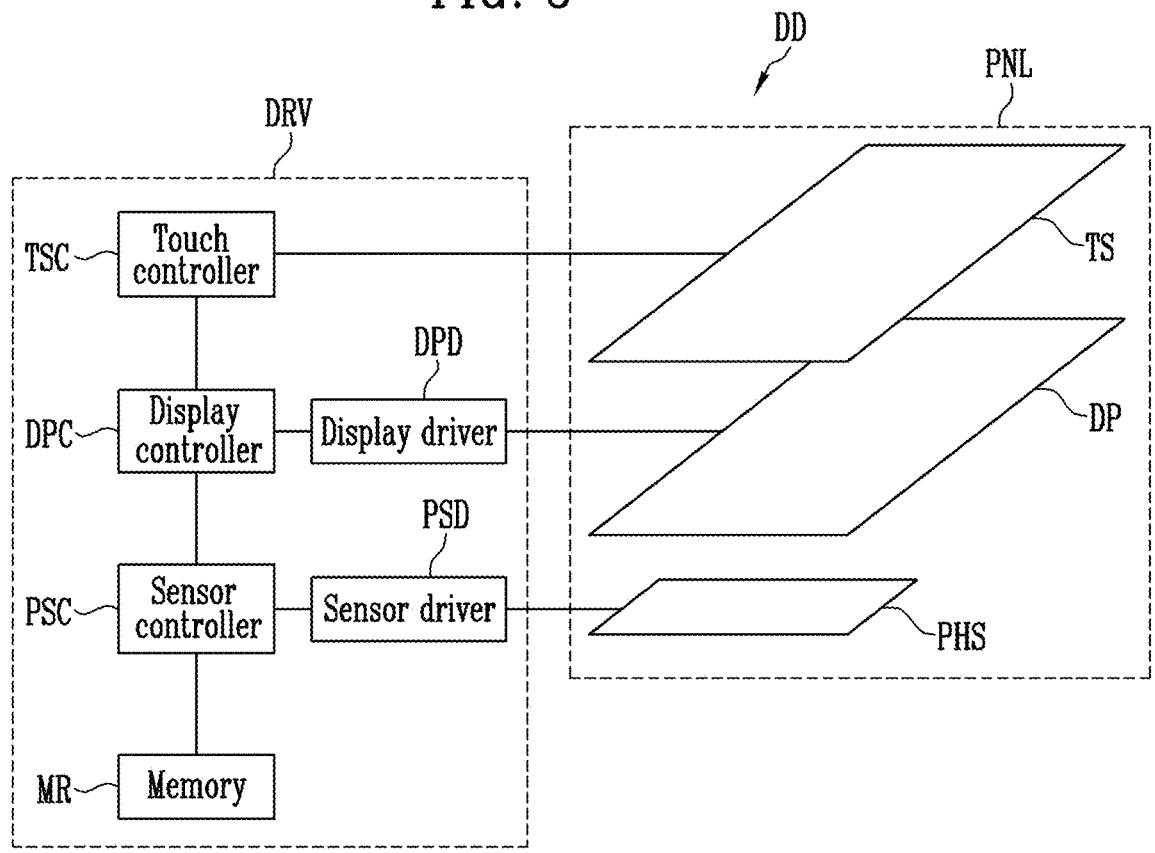
FIG. 5 is a block diagram illustrating a display device according to an embodiment of the present invention.

The sensing signal output from the sensor pixels SPXL may be converted into fingerprint data by a sensor controller PSC (also referred to as a "fingerprint detector" or a "sensor controller circuit") (see FIG. 5). The fingerprint data may be an image corresponding to a user's fingerprint pattern, for example a fingerprint image. As the fingerprint data is obtained, the user's fingerprint can be detected. That is, the user's fingerprint may be detected using the fingerprint data. The detected user's fingerprint may be used, for example, for fingerprint identification and authentication.

FIG. 4 is a perspective view schematically illustrating a display device DD according to an embodiment of the present invention.

Referring to FIGS. 1 to 4, at least one area of the display device DD may have flexibility, and the display device DD may be folded in the area having flexibility. In an embodiment, the term "folding" may mean that the shape is not fixed but can be transformed from the original shape into another shape. For example, in describing embodiments of the present invention, the term "folding" may mean a state of being folded, curved, or rolled along one or more specific lines, that is, a fold line.

For example, the display device DD may include a folding area FDA (also referred to as a "bending area") having flexibility and a flat area FLA that is continuous and flat on at least one side of the folding area FDA. The folding area FDA can be folded due to flexibility. Thus, the folding are FDA may also be referred to as a foldable area. The flat area FLA may or may not have flexibility.

The flat area FLA may include a first flat area FLA1 and a second flat area FLA2 spaced apart from each other with the folding area FDA interposed therebetween. The first flat area FLA1 may be provided in at least a portion of the display area DA and/or the non-display area NDA. The folding area FDA may be continuously disposed between the first flat area FLA1 and the second flat area FLA2. The folding area FDA may be integrally formed with the first flat area FLA1 and/or the second flat area FLA2, but is not limited thereto.

One surface of the first flat area FLA1 and one surface of the second flat area FLA2 may be provided in a folded state to be disposed substantially parallel to each other and to face each other. The present invention, however, is not limited thereto. For example, in embodiments of the present invention, the display device DD may be folded or bent so that the surfaces of the first and second flat areas FLA1 and FLA2 form a predetermined angle (e.g., an acute angle, a right angle, or an obtuse angle) with the folding area FDA interposed therebetween.

In an embodiment, the folding area FDA may be provided in the display area DA. For example, the display device DD may include the folding area FDA disposed in the display area DA, and may be folded in the folding area FDA via in-folding or out-folding. In-folding may refer to a folding scheme in which the display area DA is folded inward and is not visible to the user when the display device DD is folded, and out-folding may refer to a folding scheme in which the display area DA is folded outward and is visible to the user when the display device DD is folded.

In addition, the folding area FDA may be defined as a specific area of the display area DA, or may be formed to be changed in the entire area of the display area DA without being defined as a specific area. Also, the display device DD may include a plurality of folding areas FDA disposed in a specific area, or may be formed to be freely folded in most of areas including the display area DA.

FIG. 5 is a block diagram illustrating a display device DD according to an embodiment of the present invention.

Referring to FIGS. 1 to 5, the display device DD may include a panel unit PNL including a display panel DP, a touch sensor TS, and an optical sensor PHS, and a driving circuit unit DRV including a touch controller TSC, a display driver DPD, a display controller DPC, a sensor driver PSD, a sensor controller PSC, and a memory MR. The display panel DP, the touch sensor TS, and the optical sensor PHS may be connected to the display driver DPD, the touch controller TSC, and the sensor driver PSD, respectively. In addition, the display driver DPD and the sensor driver PSD may be connected to the display controller DPC and the sensor controller PSC, respectively.

The display driver DPD may include a gate driver and a data driver that supply signals to the pixels PX included in the display panel DP. The display controller DPC may control an image display operation of the display panel DP by supplying a driving signal to the display driver DPD. For example, the gate driver may generate gate signals based on a gate driving signal supplied from the display controller DPC, and may output the gate signals to gate lines connected to the pixels PX. The data driver may generate gray voltages corresponding to image data provided from the display controller DPC based on a data driving signal supplied from the display controller DPC. The data driver may output grayscale voltages as data voltages to data lines connected to the pixels PX.

The display controller DPC may generate a driving signal by using various control signals, including an image signal and a data enable signal, supplied from an external image source. For example, the display controller DPC may receive an image signal and a control signal from the external image source. The control signal may include a vertical synchronization signal that is a signal that distinguishes frame sections, a horizontal synchronization signal that is a row distinction signal in one frame, a data enable signal that is a high level only during a period in which data is output, and a clock signal. In addition, the driving signal may include gate and data driving signals for driving the gate and data driver, respectively.

The touch controller TSC may generate a driving signal output to the touch sensor TS, and may receive a sensing signal from the touch sensor TS. In addition, the touch controller TSC may determine whether a touch input is generated and/or a position thereof is detected, using the driving signal and the sensing signal.

The sensor driver PSD may include a scan driver that applies a scan signal to the sensor pixels SPXL included in the optical sensor PHS, and a readout driver that receives a sensing signal output from the sensor pixels SPXL.

The sensor controller PSC may include a processor that controls the operation of the sensor driver PSD, generates fingerprint data (e.g., a fingerprint image) according to an electrical signal supplied from the sensor driver PSD, and determines whether a fingerprint is of a registered user based on the generated fingerprint data. For example, the sensor controller PSC may perform the fingerprint authentication operation by sensing the user's fingerprint using the optical sensor PHS, and comparing fingerprint sensing data (e.g., a primary fingerprint image) obtained thereby with registered fingerprint data (e.g., a registered fingerprint image) stored. For example, the sensor controller PSC may allow the display device DD (or a system including the display device DD) to perform a specific function or to block operation of the specific function according to a result of fingerprint comparison operation.

In addition, when performing a fingerprint sensing operation, the sensor controller PSC may output a control signal to the display controller DPC so that the display panel DP may provide illumination for detecting a user's fingerprint pattern. For example, the sensor controller PSC controls the display controller DPC so that the pixels PX corresponding to the area where the user's finger may be located (for example, the fingerprint sensing area FSA) emit light.

In an embodiment, when the optical sensor PHS is activated for fingerprint sensing, pixels PX used as light sources for sensing the fingerprint may emit light with high luminance (e.g., luminance corresponding to white gray scale). Accordingly, fingerprint sensing contrast may be improved.

The fingerprint sensing data obtained by the optical sensor PHS may include noise due to image interference according to an internal structure of the display panel DP, for example, positions of pinholes PIH. The sensor controller PSC may correct the obtained fingerprint image by using calibration data (hereinafter referred to as "reference data") stored in advance. The reference data may be image data for removing noise due to, for example, image interference, and may be stored in the memory MR.

That is, when the fingerprint sensing data is obtained, the sensor controller PSC may correct the obtained fingerprint sensing data by using the reference data stored in the memory MR. However, when the position between the pinhole optical system (e.g., pinholes PIH) and the optical sensor PHS in the display device DD is changed due to, for example, folding, it may be difficult to remove noise from the obtained fingerprint image by using the calibration data stored in the memory MR. Accordingly, accuracy of fingerprint detection may decrease.

The sensor controller PSC according to an embodiment of the present invention may include a movement amount detector MDT (see FIGS. 18A and 18B) for detecting misalignment information indicating a degree of misalignment between the pinhole optical system (e.g., pinholes PIH) and the optical sensor PHS (e.g., a difference in a movement amount of the pinhole optical system and the optical sensor PHS), and a calculator OP (see FIGS. 18A and 18B) for generating new calibration data corresponding to the detected information. As a result, noise may be removed from the obtained fingerprint image according to embodiments of the present invention.

Figure 6:
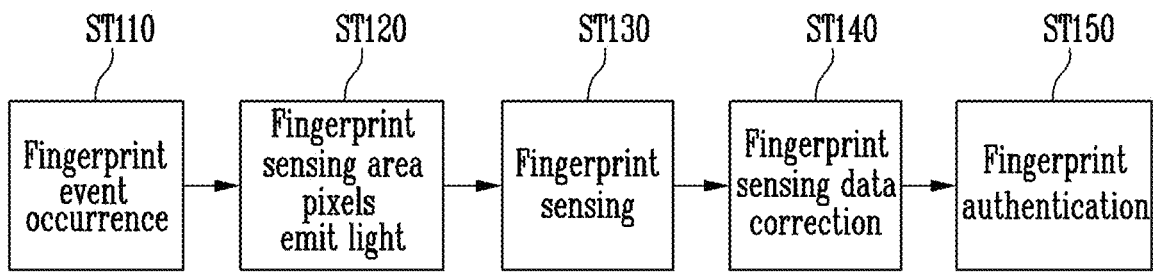
FIG. 6 is a block diagram illustrating a fingerprint detection and authentication method according to an embodiment of the present invention.

FIG. 6 is a block diagram illustrating a fingerprint detection and authentication method according to an embodiment of the present invention. Hereinafter, the fingerprint detection and authentication method according to an embodiment of the present invention will be sequentially described with reference to FIGS. 1 to 6.

<ST110 and ST120: Fingerprint Event Occurrence Operation and Pixel Light-Emitting Operation>

First, when a fingerprint event requesting fingerprint authentication occurs, the pixels PX in the fingerprint sensing area FSA and/or a surrounding area thereof emit light to sense the fingerprint. In an embodiment, predetermined pixels PX corresponding to the fingerprint sensing area FSA may be used as light sources for sensing the fingerprint. In an embodiment, when a position of a touch input when a user's finger touches and approaches is sensed by the touch controller TSC, at least some of the pixels PX corresponding to the position in which the touch input occurs may be also used as light sources for sensing the fingerprint.

<ST130: Fingerprint Sensing Operation>

Next, the reflected light, which is reflected from the user's fingerprint and passes through the pinholes PIH, is sensed using the optical sensor PHS. As a result, the user's fingerprint may be sensed. Accordingly, fingerprint sensing data (also referred to as "primary fingerprint data" or a "primary fingerprint image") can be obtained. The fingerprint sensing data may be generated by collecting electrical signals occurring according to an amount of light received from each of the sensor pixels SPXL.

<ST140: Fingerprint Sensing Data Correction Operation>

Next, noise included in the fingerprint sensing data may be removed using calibration data (also referred to as "reference image data") stored in the memory MR. Accordingly, the user's fingerprint can be detected.

<ST150: Fingerprint Authentication Operation>

Next, fingerprint authentication may be performed by comparing the detected user's fingerprint with the registered user's fingerprint. For example, when the detected user's fingerprint and the registered user's fingerprint pattern are determined to match, it may be determined that the fingerprint authentication is successful, and the fingerprint authentication may be completed. The detected user's fingerprint and the registered user's fingerprint may be determined to match when a similarity score representing the similarity between the detected user's fingerprint and the registered user's fingerprint exceeds a predetermined threshold.

FIGS. 7A to 11B illustrate a method of correcting fingerprint sensing data according to an embodiment of the present invention. For example, FIGS. 7A to 11A illustrate each image related to the fingerprint image correction, and FIGS. 7B to 11B illustrate an image profile obtained from each image along line II-II' shown in FIGS. 7A to 11A or a line at the position corresponding thereto. For example, FIGS. 7B to 11B illustrate brightness (intensity or amplitude of light) according to a position in the X-axis direction obtained from the images shown in FIGS. 7A to 11A, respectively. In an embodiment, the position in the X-axis direction may be defined according to the X coordinate, and the brightness at each position may be defined according to the grayscale voltage value.

In FIGS. 7B to 11B, the image profile along the X-axis direction in FIGS. 7A to 11A is shown, but the reference axis may be changed. For example, the reference axis may be changed to the Y-axis.

Figure 7A:
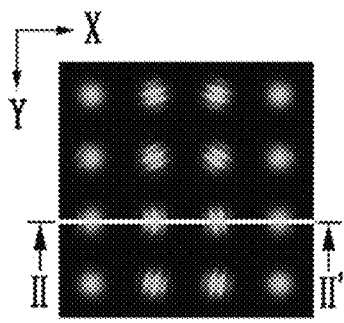
FIGS. 7A to 11B illustrate a method of correcting fingerprint sensing data according to an embodiment of the present invention.

Referring to FIGS. 1 to 11B, through the fingerprint sensing operation ST130 of FIG. 6, fingerprint sensing data, that is, primary fingerprint data (also referred to as a "primary fingerprint image") in the form of the fingerprint image as shown in FIG. 7A, can be obtained. In an embodiment, the fingerprint sensing data may have an image profile as shown in FIG. 7B.

Each fingerprint image (or calibration image) and corresponding image profile may change according to positions of the pinholes PIH. For example, the brightness (e.g., an amount of light received by the sensor pixels SPXL) of the fingerprint image at a position corresponding to a center of each of the pinholes PIH may have a maximum value, and the brightness of the fingerprint image may decrease toward the surrounding area. For example, the brightness of the fingerprint image at a central point between two adjacent pinholes PIH may have a minimum value.

That is, the fingerprint sensing data obtained through the fingerprint sensing operation ST130 may include optical characteristics according to positions of pinholes PIH in addition to optical characteristics due to valleys and ridges of the fingerprint. Therefore, to extract the optical characteristics according to the user's fingerprint pattern, a light component (e.g., noise) according to the positions of the pinholes PIH is removed.

Figure 8A:
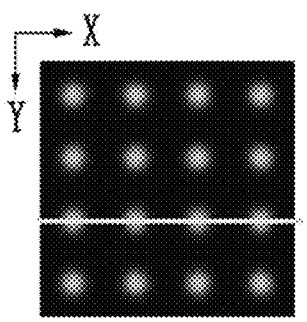
Figure 7B:
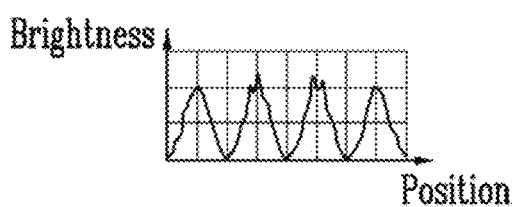

To this end, the calibration data (also referred to as a "calibration image") as shown in FIG. 8A may be used. The calibration data can be obtained from the memory MR. For example, in a manufacturing step of the display device DD, a calibration chart such as a reflector may be disposed on the fingerprint sensing area FSA, and the reflected light incident on the sensor pixels SPXL may be sensed to obtain the calibration data, and then the calibration data may be stored in the memory MR.

Figure 8B:
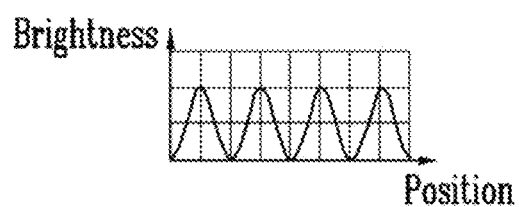

The calibration data stored in the memory MR may have a light distribution characteristic according to the positions of the pinholes PIH. For example, the calibration data may have an image profile as shown in FIG. 8B.

Figure 9A:
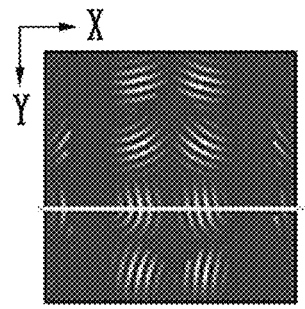

The optical characteristics according to the user's fingerprint pattern may be extracted from the fingerprint sensing data as shown in FIG. 7A by using the calibration data as shown in FIG. 8A. For example, secondary fingerprint data (also referred to as a "second fingerprint image") as shown in FIG. 9A may be obtained by determining a difference between the fingerprint sensing data and the calibration data.

Figure 10A:
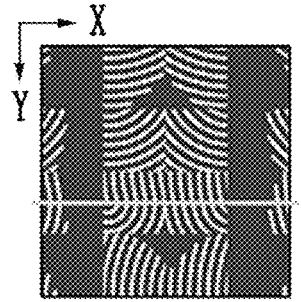
Figure 9B:
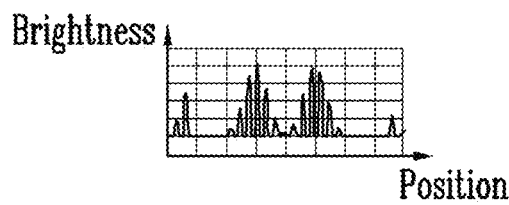
Figure 10B:
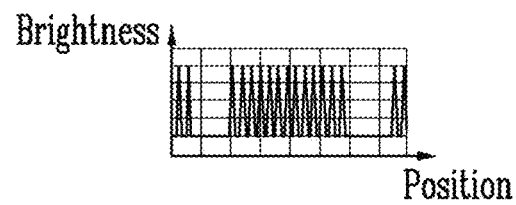
Figure 11A:
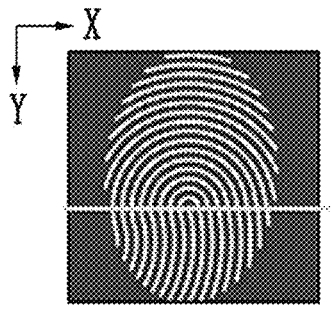
Figure 11B:
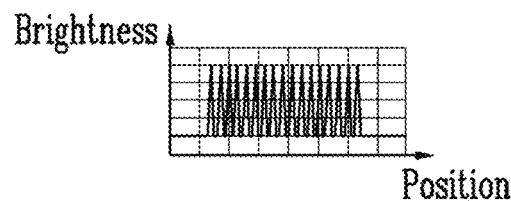

Next, as shown in FIGS. 10A to 11B, final fingerprint data (also referred to as a "final fingerprint image") may be obtained through distortion correction. In an embodiment, a distortion correction operation, as shown in FIGS. 10A and 10B, may include an operation of obtaining third fingerprint data (also referred to as a "third fingerprint image") through a flattening process that uniformly corrects brightness deviation according to a position (e.g., uniformly adjusts intensity of a signal), and an operation of obtaining fourth fingerprint data (also referred to as a "fourth fingerprint image" or "final fingerprint data") as shown in FIG. 11A by rotating the third fingerprint data shown in FIG. 10A by 180 degrees. For example, by rotating the third fingerprint data by 180 degrees and synthesizing the third fingerprint data shown in FIG. 10A for each unit area centered on each pinhole PIH, the fourth fingerprint data can be obtained as shown in FIG. 11A.

FIGS. 12A to 12D illustrate the occurrence of misalignment between a pinhole optical system and an optical sensor PHS due to folding of a display device DD, and a positional deviation of pinholes PIH in fingerprint sensing data and calibration data according thereto. For convenience of description, in the following embodiments, it is assumed that misalignment between the pinhole optical system of the display panel DP and the optical sensor PHS in the X-axis direction according to whether the display device DD is folded and a degree thereof (e.g., a folding angle).

Figure 12A:
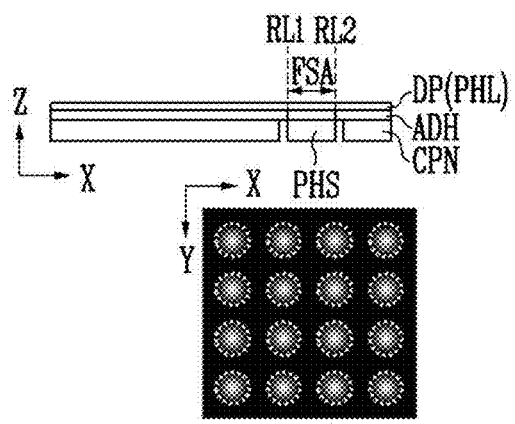
FIGS. 12A to 12D illustrate the occurrence of misalignment between a pinhole optical system and an optical sensor due to folding of a display device, and a positional deviation of pinholes in fingerprint sensing data and calibration data according thereto.

Referring to FIGS. 1 to 12D, first, when the display device DD is not folded as shown in FIG. 12A, the optical sensor PHS may be disposed in an initial position within reference lines RL1 and RL2 of the fingerprint sensing area FSA. In this case, the positions of the pinholes PIH in the fingerprint sensing data obtained through the optical sensor PHS may substantially match the positions of the pinholes PIH in the calibration data. For example, the calibration data may be obtained when the display device DD is not folded and unfolded, and thus may include position information of pinholes PIH obtained based on the initial position of the optical sensor PHS.

Figure 12B:
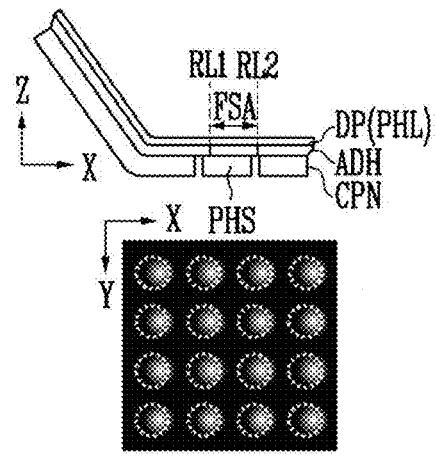
Figure 12C:
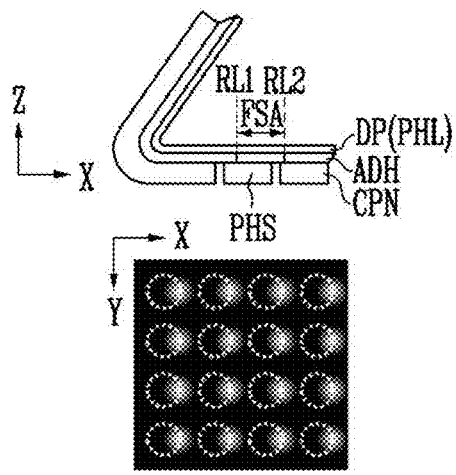
Figure 12D:
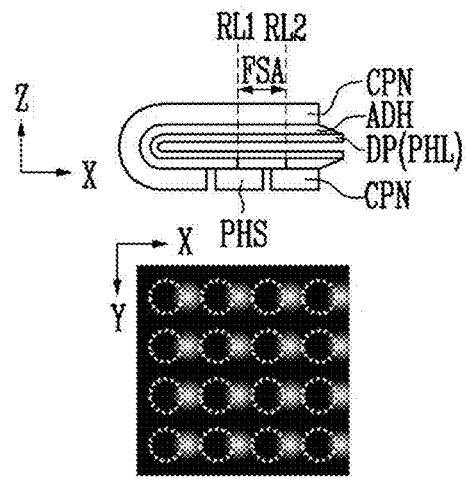

When the display device DD is folded as shown in FIGS. 12B to 12D, the pinhole optical system of the display panel DP and the optical sensor PHS may be misaligned while the display panel DP is pushed at least along the X-axis, and thus the positions of the pinhole optical system and the optical sensor PHS may be different from the initial position when obtaining the calibration data. For example, to prevent damage to the display device DD due to the folding, the optical sensor PHS may be attached to the rear surface of the display panel DP by using the adhesive member ADH having elasticity. In this case, as the display device DD is folded, the adhesive member ADH is pushed, and a deviation in a movement amount of the display panel DP and the optical sensor PHS may occur in the X-axis direction. For example, as the display panel DP is pushed, at least one area of the optical sensor PHS may be disposed outside the reference lines RL1 and RL2 of the fingerprint sensing area FSA. Accordingly, misalignment of the pinhole optical system of the display panel DP and the optical sensor PHS may occur, which may occur in different widths according to the folding angle of the display device DD. That is, according to the folding angle of the display device DD, a slip phenomenon in which the positions of the pinhole optical system and the optical sensor PHS are misaligned may occur.

When the slip phenomenon occurs, the positions of pinholes PIH in the fingerprint sensing data obtained through the optical sensor PHS while the display device DD is folded may be different from the positions of the pinholes PIH in the calibration data stored according to the initial position of the pinhole optical system and the optical sensor PHS while the display device DD is not folded. In particular, as the degree of folding (or folding angle) increases, the movement amount of the display panel DP increases, and thus the positional deviation between the pinhole optical system and the optical sensor PHS increases. Accordingly, the positional deviation of pinholes PIH in the fingerprint sensing data and the calibration data may increase.

FIGS. 13A to 17B illustrate a process of processing fingerprint sensing data obtained by an optical sensor PHS in a state in which misalignment between the pinhole optical system and the optical sensor PHS occurs, and an image profile according thereto. For example, FIGS. 13A to 17A illustrate each image related to the fingerprint sensing data, and FIGS. 13B to 17B illustrate an image profile obtained from each image along line III-III' shown in FIGS. 13A to 17A or a line at the position corresponding thereto. For example, FIGS. 13B to 17B illustrate brightness (intensity or amplitude of light) according to a position in the X-axis direction obtained from the images shown in FIGS. 13A to 17A, respectively.

Compared with each image shown in FIGS. 7A to 11B and an image profile corresponding thereto, in each image shown in FIGS. 13A to 17B and an image profile corresponding thereto, the positions of the pinholes PIH in fingerprint sensing data sensed through the optical sensor PHS are different from the positions of the pinholes PIH in the calibration data prestored, and thus it may be difficult to effectively remove noise from the fingerprint sensing data using the calibration data.

Figure 13A:
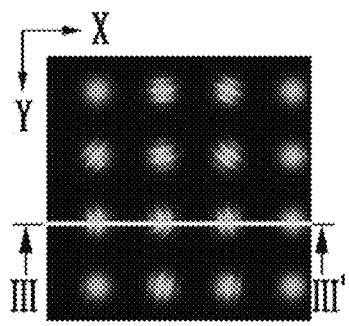
FIGS. 13A to 17B illustrate a process of processing fingerprint sensing data obtained by an optical sensor in a state in which misalignment between the pinhole optical system and the optical sensor occurs, and an image profile according thereto.
Figure 14A:
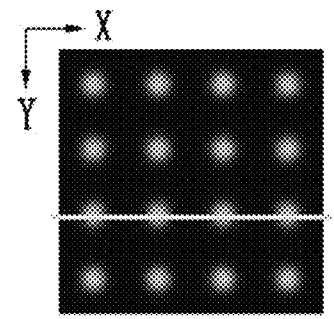
Figure 13B:
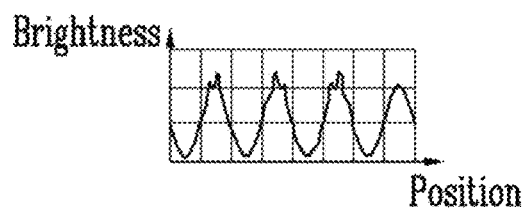
Figure 14B:
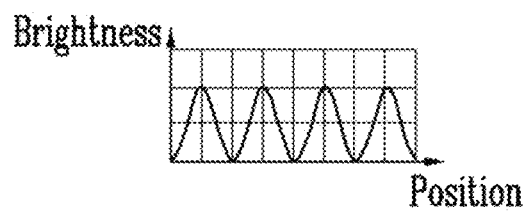
Figure 15A:
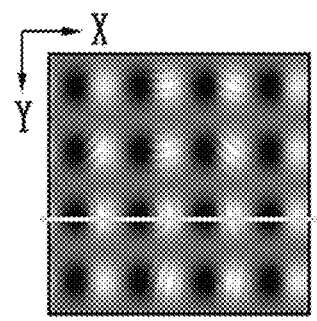
Figure 16A:
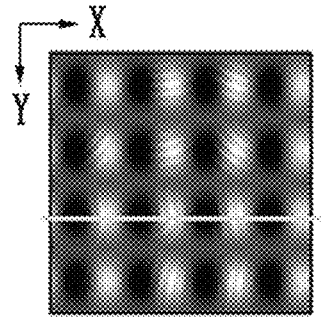
Figure 15B:
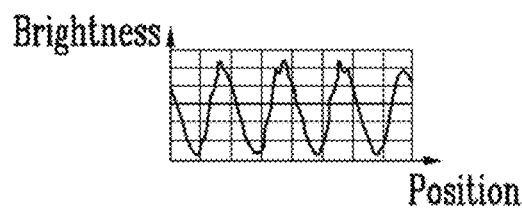
Figure 16B:
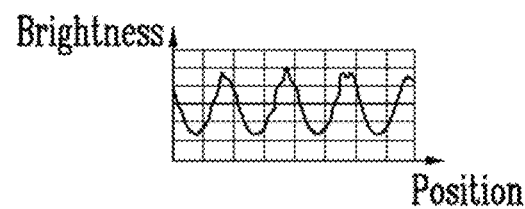
Figure 17A:
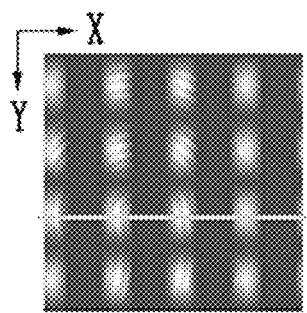
Figure 17B:
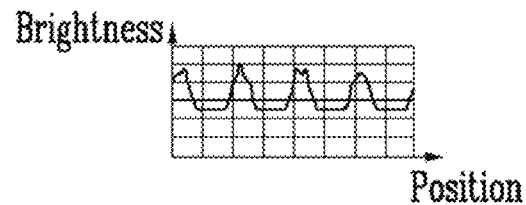

For example, fingerprint sensing data as shown in FIG. 13A obtained through the fingerprint sensing operation ST130 of FIG. 6 when the pinhole optical system and the optical sensor PHS are misaligned, may be different from the fingerprint sensing data shown in FIG. 7A. Further, calibration data used for distortion correction of the fingerprint sensing data as shown in FIG. 13A, for example, the calibration data shown in FIG. 14A may be substantially the same as the calibration data shown in FIG. 8A. In this case, it may be difficult to effectively remove noise from the fingerprint sensing data, and thus a signal-to-noise ratio (hereinafter, referred to as "SNR") may decrease, and thus fingerprint detection and authentication performance of the display device DD may decrease.

Accordingly, in an embodiment to be described later, the sensor controller PSC may detect misalignment information indicating a degree of misalignment between the pinhole optical system and the optical sensor PHS due to folding of the display device DD (e.g., the difference in the movement amount between the pinhole optical system and the optical sensor PHS and/or the folding angle of the display device DD), and may generate new calibration data capable of effectively removing noise from the fingerprint sensing data. In addition, the memory MR may store reference data (also referred to as "reference calibration data") that can be referenced when the sensor controller PSC generates new calibration data.

That is, an embodiment to be described later, based on the information on the misalignment between the pinhole optical system and the optical sensor PHS, may generate new calibration data using calibration data prestored in the memory MR, or may select at least one of a plurality of calibration data prestored as calibration data to be used for correcting the actual fingerprint sensing data. Accordingly, in an embodiment to be described later, by naming calibration data prestored in the memory MR as "reference data", and by naming calibration data generated or selected based on the information on the misalignment of the pinhole optical system and the optical sensor PHS as "calibration data", the calibration data (e.g., reference data in the following embodiments) prestored and the calibration data (e.g., calibration data in the following embodiments) to be actually used for correcting fingerprint sensing data will be distinguished.

Figure 18A:
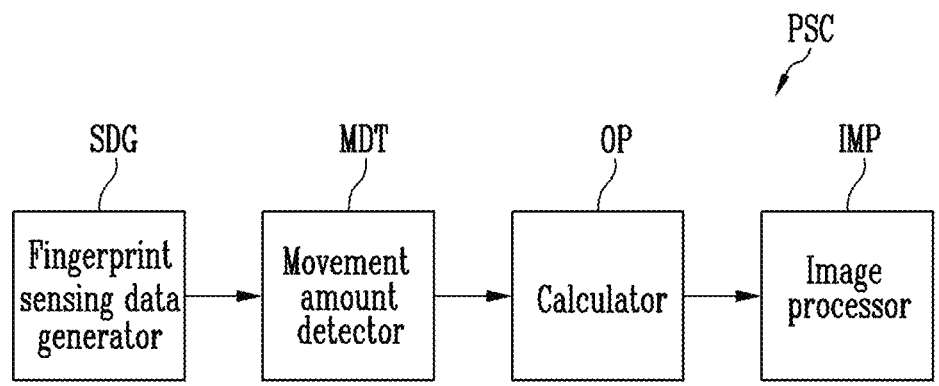
FIGS. 18A and 18B are block diagrams illustrating a sensor controller according to an embodiment of the present invention.
Figure 18B:
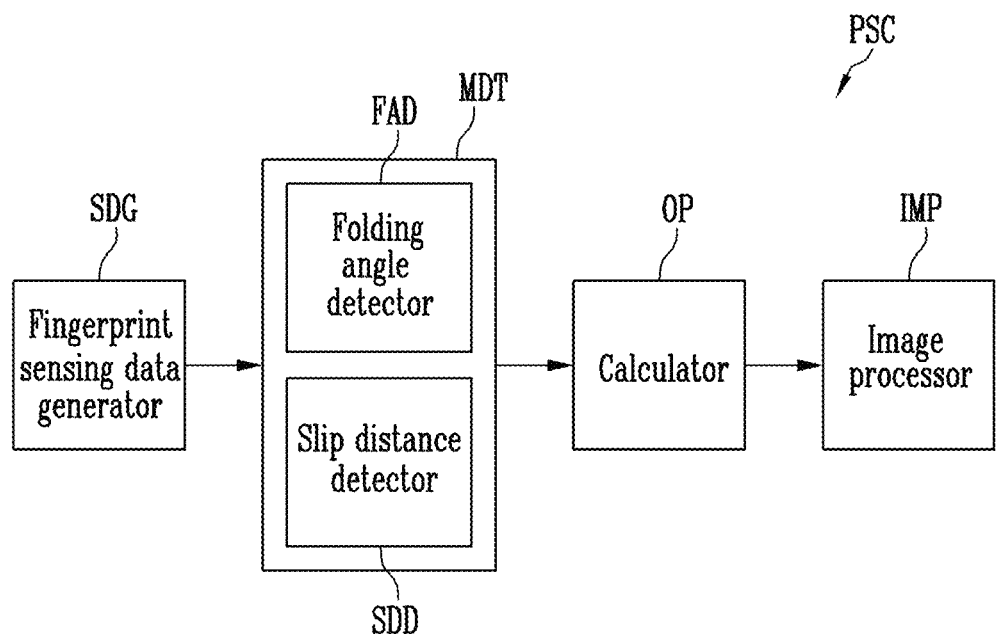

FIGS. 18A and 18B are block diagrams illustrating a sensor controller PSC according to an embodiment of the present invention. For example, FIGS. 18A and 18B illustrate an embodiment of the configuration of the sensor controller PSC of FIG. 5 with focus on the configuration for generating new calibration data.

Referring to FIGS. 1 to 18B, the sensor controller PSC may include a fingerprint sensing data generator SDG (also referred to as a "fingerprint sensing data generator circuit"), a movement amount detector MDT (also referred to as a "movement amount detector circuit"), a calculator OP (also referred to as a "calculator circuit"), and an image processor IMP (also referred to as an "image processor circuit").

The fingerprint sensing data generator SDG may generate fingerprint sensing data by using electrical signals input from the optical sensor PHS. For example, the fingerprint sensing data generator SDG may generate the fingerprint sensing data by collecting output signals from the sensor pixels SPXL.

The movement amount detector MDT may detect misalignment information indicating a degree of misalignment between the pinhole optical system of the display panel DP and the optical sensor PHS. For example, the movement amount detector MDT may detect a difference in the movement amount between the pinhole optical system and the optical sensor PHS due to folding of the display device DD.

In an embodiment, the movement amount detector MDT may detect position information of the pinholes PIH from fingerprint sensing data generated by the fingerprint sensing data generator SDG, and may compare the detected position information with the reference data stored in the memory MR, thereby detecting the difference (e.g., a slip distance) in the movement amount between the pinhole optical system and the optical sensor PHS. To this end, the movement amount detector MDT may include a slip distance detector SDD.

In an embodiment, the movement amount detector MDT may extract position information of the pinholes PIH by using the folding angle of the display device DD sensed through the touch sensor TS (or a folding sensor), and may compare the extracted position information with reference data stored in the memory MR, thereby detecting the difference (or an offset value) in the movement amount between the pinhole optical system and the optical sensor PHS. To this end, the sensor controller PSC may include a folding angle detector (also referred to as a "folding angle detector circuit") that detects whether the display device DD is folded and/or an angle thereof based on a sensing signal from the touch sensor TS (or a folding sensor). In an embodiment, the folding angle detector FAD may be provided in the touch controller TSC.

That is, the movement amount detector MDT may detect misalignment information indicating a degree of misalignment between the pinhole optical system and the optical sensor PHS through various configurations and/or methods. To this end, the movement amount detector MDT may include a slip distance detector SDD and/or a folding angle detector FAD as shown in FIG. 18B.

The calculator OP (also referred to as a "calibration data generator") may generate calibration data corresponding to the movement amount of the optical sensor PHS detected by the movement amount detector MDT. For example, the calculator OP may select any one of the reference data stored in the memory MR according to information (e.g., a slip distance and/or folding angle, etc.) on misalignment between the pinhole optical system and the optical sensor PHS, or may select and interpolate at least two reference data, thereby generating (or selecting) new calibration data to be used for correction of the fingerprint sensing image.

The image processor IMP may generate final fingerprint data by correcting the fingerprint sensing data obtained from the optical sensor PHS using the calibration data generated by the calculator OP. For example, the image processor IMP may generate the final fingerprint data by subtracting the calibration data generated by the calculator OP from the fingerprint sensing data and by correcting distortion of the subtracted image.

Figure 19:
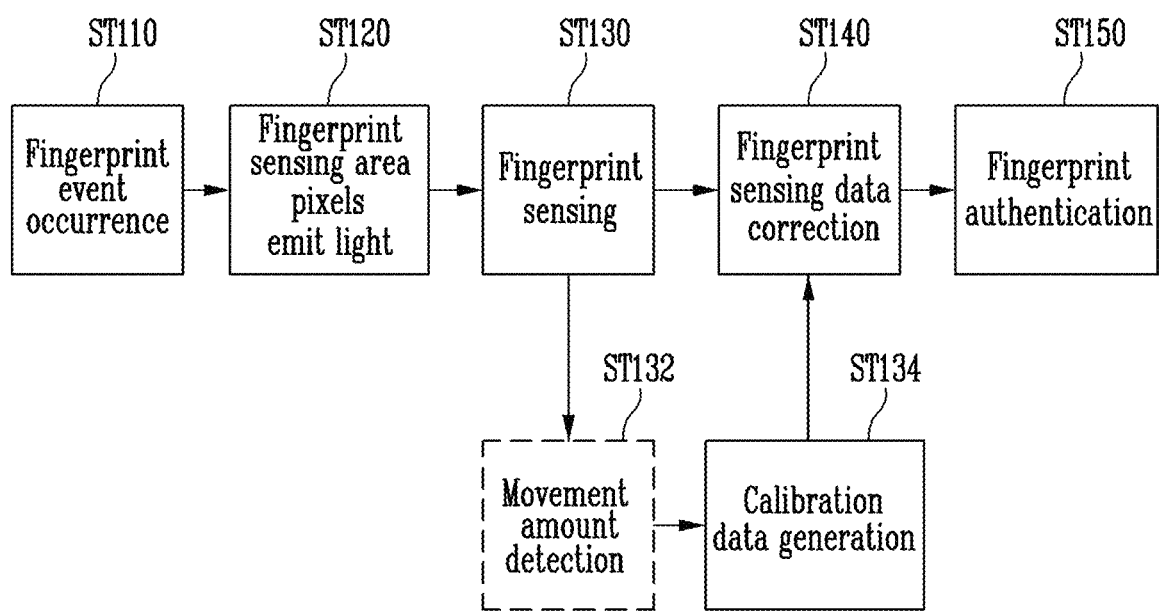
FIG. 19 is a block diagram illustrating a fingerprint detection and authentication method according to an embodiment of the present invention.
Figure 20A:
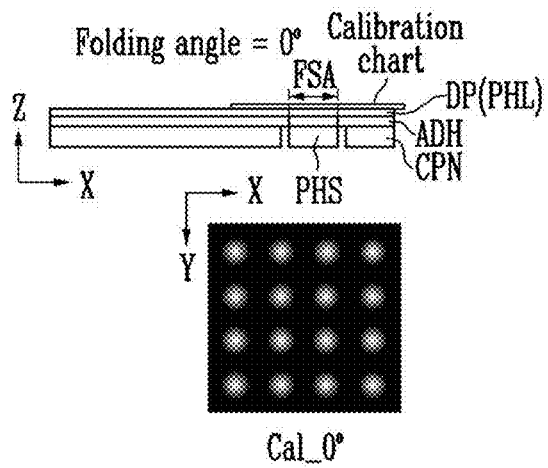
FIGS. 20A to 20D illustrate a method of generating reference data according to an embodiment of the present invention.
Figure 20B:
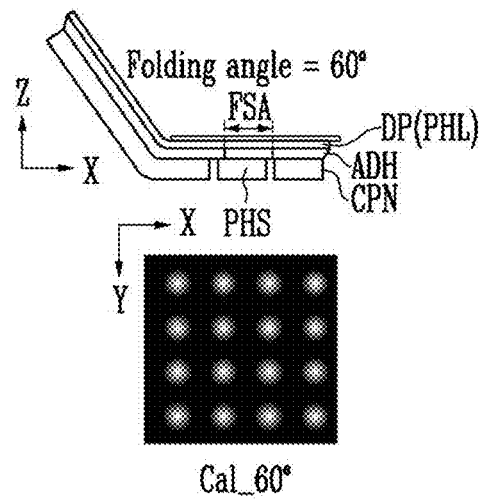
Figure 20C:
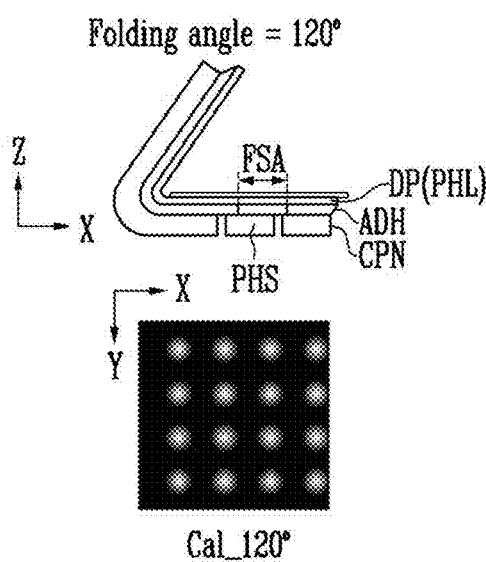
Figure 20D:
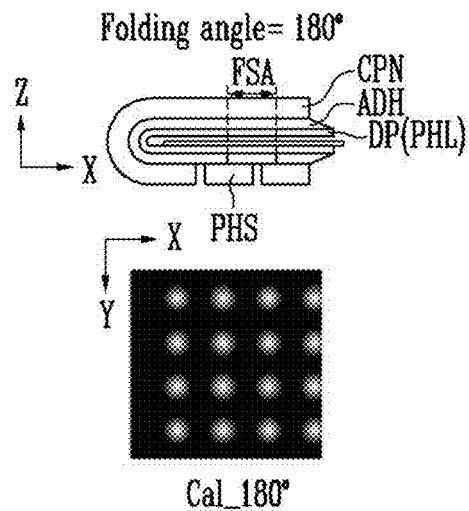

FIG. 19 is a block diagram illustrating a fingerprint detection and authentication method according to an embodiment of the present invention. Compared with the embodiment of FIG. 6, the embodiment of FIG. 19 may further include a movement amount detection operation ST132 and a calibration data generation operation ST134.

Hereinafter, the fingerprint detection and authentication method according to an embodiment of the present invention will be sequentially described with reference to FIGS. 1 to 19. In describing an embodiment of FIG. 19, a further detailed description of components and technical aspects previously described with reference to FIG. 6 may be omitted.

<ST132: Movement Amount Detection Operation>

After the fingerprint sensing data is obtained through the fingerprint sensing operation ST130, misalignment information indicating a degree of misalignment between the pinhole optical system and the optical sensor PHS may be detected from the fingerprint sensing data. In an embodiment, position information of pinholes PIH may be extracted from the fingerprint sensing data, and the difference in the movement amount between the pinhole optical system and the optical sensor PHS may be detected, thereby comparing it with reference data stored in the memory MR.

According to an embodiment, the movement amount detection operation ST132 may be performed by the movement amount detector MDT according to embodiments of FIGS. 18A and 18B. However, the present invention is not limited thereto.

According to an embodiment of the present invention, the movement amount detection operation ST132 may be omitted. In this case, after the fingerprint sensing operation ST130 is performed, the calibration data generation operation ST134 may be immediately performed.

<ST134: Calibration Data Generation Operation>

After obtaining the fingerprint sensing data and/or detecting the movement amount of the optical sensor PHS, the calibration data corresponding to the position information of the pinholes PIH extracted from the fingerprint sensing data and/or the movement amount of the optical sensor PHS may be generated. According to an embodiment, the calibration data generation operation ST134 may be performed by the calculator OP according to embodiments of FIGS. 18A and 18B. However, the present invention is not limited thereto.

The calibration data may be generated in various ways, and a detailed description of embodiments related thereto will be described in further detail below.

After the calibration data is generated, the fingerprint sensing data correction operation ST140 and the fingerprint authentication operation ST150 using the calibration data may be sequentially performed.

FIGS. 20A to 20D illustrate a method of generating reference data according to an embodiment of the present invention. For example, FIGS. 20A to 20D illustrate a method of generating reference data that may be stored in the memory MR of FIG. 5 and may be used to generate (or select) the calibration data by the sensor controller PSC in the manufacturing step of the display device DD.

Referring to FIGS. 1 to 20D, in a manufacturing step (e.g., a factory calibration step) of the display device DD, a calibration chart may be disposed on the fingerprint sensing area FSA, and calibration data corresponding to a plurality of folding angles (also referred to as "reference folding angles") may be obtained by using the optical sensor PHS. In addition, the calibration data obtained at each folding angle may be stored in the memory MR as reference data.

For example, as shown in FIGS. 20A to 20D, in a state in which the display device DD is folded or bent at each of angles of 0°, 60°, 120°, and 180°, the calibration data may be obtained by sensing the reflected light from the calibration chart using the optical sensor PHS. The calibration data obtained by the optical sensor PHS at each folding angle may be stored in the memory MR as reference data (Cal_0°, Cal_60°, Cal_120°, and Cal_180°) for the corresponding folding angle.

FIGS. 21A and 21B illustrate a method of selecting reference data according to an embodiment of the present invention. For example, FIGS. 21A and 21B illustrate an embodiment of a method of selecting reference data that can be used to generate the calibration data by the sensor controller PSC (e.g., the calculator OP) of FIGS. 18A and 18B.

Referring to FIGS. 1 to 21B, position information (e.g., X and Y coordinates) of the pinholes PIH may be extracted from the fingerprint sensing data obtained through the optical sensor PHS as shown in FIG. 21A. For example, the position information of each pinhole PIH may be extracted from an image profile of the fingerprint sensing data, and coordinate values thereof may be stored.

Next, as shown in FIG. 21B, by comparing the position information of pinholes PIH extracted from the fingerprint sensing data with reference data for each folding angle (e.g., coordinate data extracted from the reference data) stored in the memory MR, at least one piece of reference data having a high degree of similarity may be selected.

When there is reference data matching the position information of the pinholes PIH extracted from the fingerprint sensing data, the reference data may be selected as calibration data.

When there is no reference data matching the position information of the pinholes PIH extracted from the fingerprint sensing data, two pieces of reference data having a high degree of similarity to the reference data may be selected, and new calibration data may be generated by interpolating the two pieces of reference data. For example, when there is a difference in the movement amount between the pinhole optical system and the optical sensor PHS in the X-axis direction due to folding of the display device DD (e.g., when the pinhole optical system moves in the X-axis direction and misalignment occurs while the display panel DP is pushed out compared to the optical sensor PHS), two pieces of reference data having a high degree of similarity may be selected by comparing the X coordinate of the pinholes PIH extracted from the fingerprint sensing data and the X coordinate of the pinholes PIH extracted from the reference data.

Figure 22:
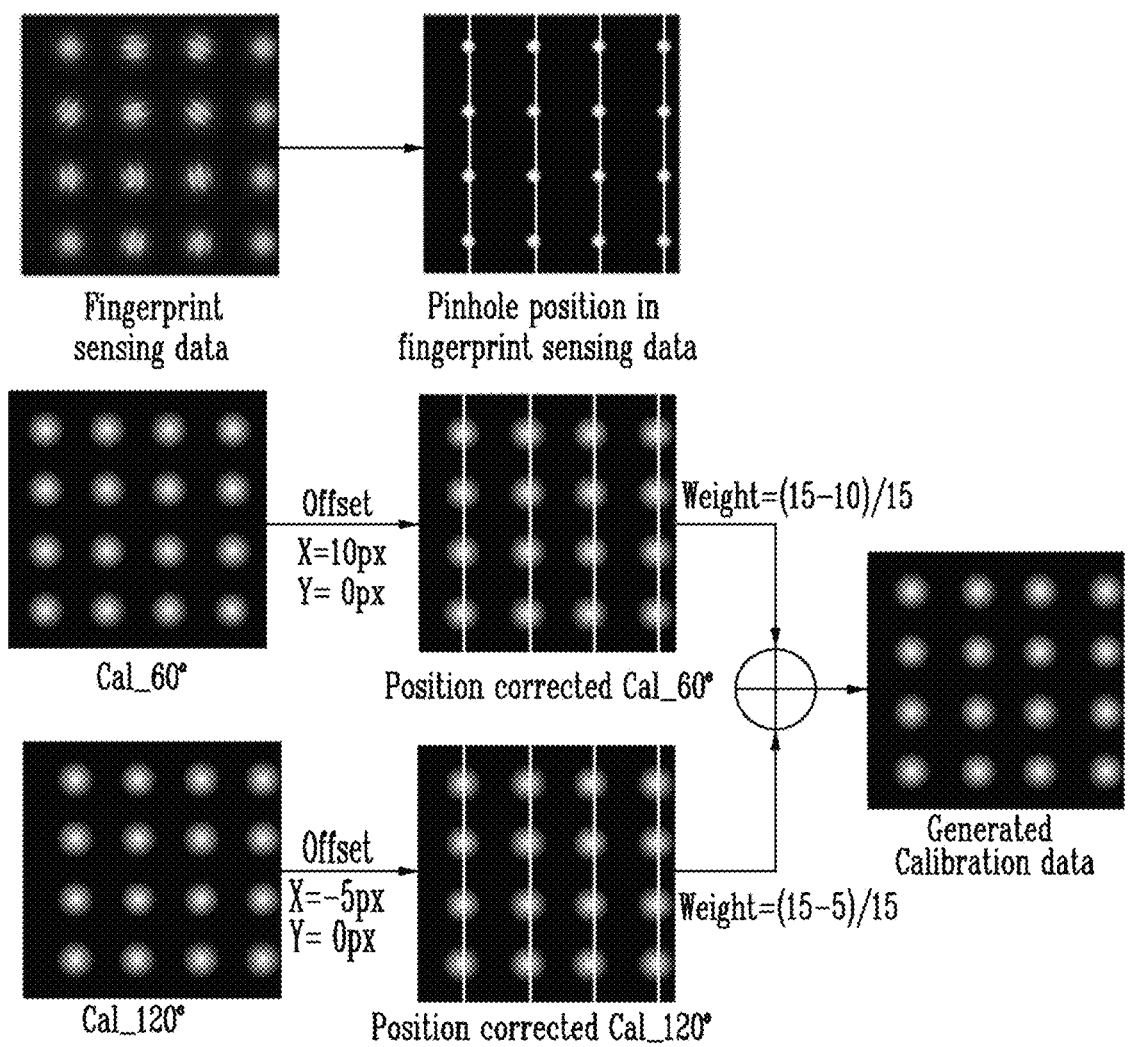
FIG. 22 illustrates a method of generating calibration data according to an embodiment of the present invention.

FIG. 22 illustrates a method of generating calibration data according to an embodiment of the present invention. For example, FIG. 22 illustrates an embodiment of a method of generating the calibration data by the sensor controller PSC (e.g., the calculator OP) of FIGS. 18A and 18B.

Referring to FIGS. 1 to 22, the calibration data may be generated by using two pieces of reference data selected through, for example, a method disclosed with reference to the embodiment of FIGS. 21A and 21B. For example, for each of the two selected pieces of reference data, the position of the pinholes PIH may be corrected by assigning offset values to the two pieces of reference data so that the positions of the pinholes PIH match the positions of the pinholes PIH in the fingerprint sensing data.

For example, when reference data Cal_60° and Cal_120° for folding angles 60° and 120° are selected, and the positional deviation of the pinholes PIH between the reference data Cal_60° for folding angle 60° and the fingerprint sensing data in the X-axis direction is 10 px (e.g., 10 pixels; moving distance calculated based on the sensor pixel SPXL), the positions of the pinholes PIH may be corrected by assigning the offset value of 10 px in the X-axis direction for the reference data Cal_60° for the folding angle 60°. Similarly, when the positional deviation of the pinholes PIH between the reference data Cal_120° for the folding angle 120° and the fingerprint sensing data in the X-axis direction is −5 px, the positions of the pinholes PIH may be corrected by assigning the offset value of −5 px in the X-axis direction for the reference data Cal_120° for the folding angle 120°.

Next, weights may be respectively assigned to the reference data Cal_60° and Cal_120° for folding angles of 60° and 120°, and a weighted sum is performed, thereby generating calibration data. For example, when the offset values for the reference data Cal_60° and Cal_120° for folding angles of 60° and 120° are 10 px and −5 px, respectively, (15-10)/15, that is, a weight of ⅓, is assigned to the reference data Cal_60° for the folding angle of 60°, a weight of (15-5)/15, that is, a weight of ⅔ is assigned to the reference data Cal_120° for a folding angle of 120°, and a weighted sum is performed, thereby generating the calibration data. The generated calibration data may be used to correct the fingerprint sensing data (e.g., may be used for noise removal).

Figure 23:
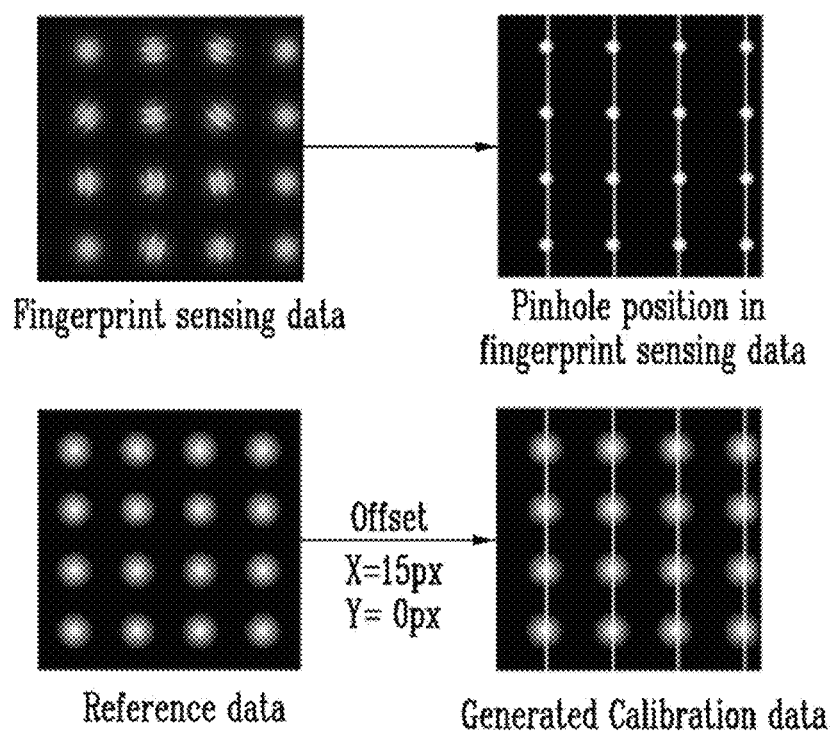
FIG. 23 illustrates a method of generating calibration data according to an embodiment of the present invention.

FIG. 23 illustrates a method of generating calibration data according to an embodiment of the present invention. For example, FIG. 23 illustrates an embodiment of a method of generating calibration data by the sensor controller PSC (e.g., the calculator OP) of FIGS. 18A and 18B.

Referring to FIGS. 1 to 23, instead of generating a plurality of pieces of reference data in the manufacturing step of the display device DD, only one piece of reference data corresponding to a predetermined folding angle (also referred to as a "reference folding angle") (e.g., 0° or 90°, etc.) may be generated and stored in the memory MR. In addition, the calibration data may be generated using the reference data. For example, the reference data may be obtained at a predetermined folding angle, and position information of the pinholes PIH in the reference data may be extracted.

Next, the position information of the pinholes PIH may be extracted from the fingerprint sensing data obtained for fingerprint authentication of the user, and the offset value (e.g., 15 px) according to the positional deviation of the pinholes PIH in the stored reference data and the fingerprint sensing data may be calculated.

Next, calibration data may be generated by correcting the positions of the pinholes PIH by applying the calculated offset value to the reference data so that the positions of the pinholes PIH in the reference data and the fingerprint sensing data match. The generated calibration data may be used to correct the fingerprint sensing data.

Figure 24:
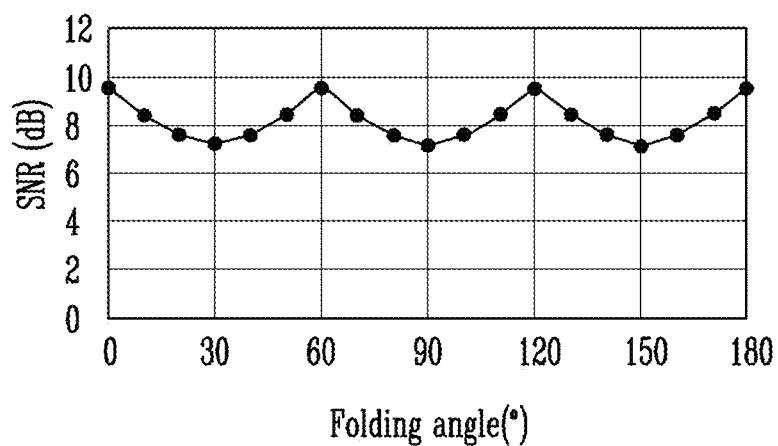
FIG. 24 illustrates an effect according to an embodiment of using a plurality of reference data for a plurality of folding angles.

FIG. 24 illustrates an effect according to an embodiment of using a plurality of reference data for a plurality of folding angles. For example, FIG. 24 illustrates SNR for each folding angle in the display device DD that generates calibration data according to the embodiments of FIGS. 20A to 22.

Referring to FIG. 24, a high SNR can be ensured at a folding angle (e.g., folding angles of 0°, 60°, 120°, and 180°) corresponding to reference data stored in the memory MR. In addition, a relatively high SNR of a certain level or higher can be ensured for the other folding angles.

Figure 25:
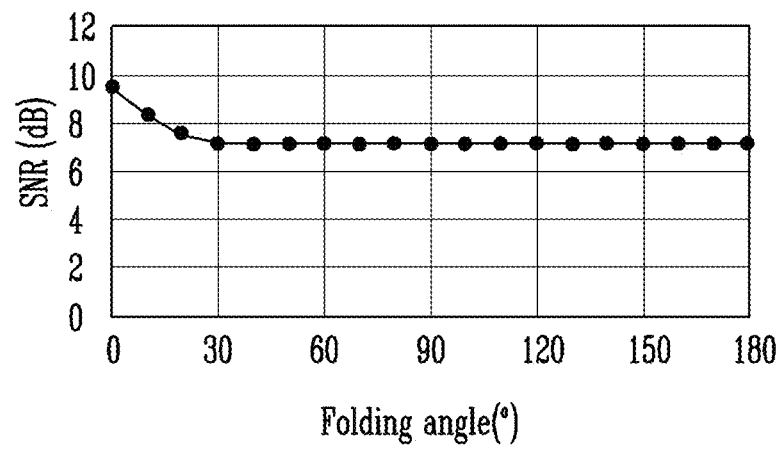
FIG. 25 illustrates an effect according to an embodiment of using a single piece of reference data for a single folding angle.

FIG. 25 illustrates an effect according to an embodiment of using a single piece of reference data for a single folding angle. For example, FIG. 25 illustrates SNR for each folding angle in the display device DD that generates calibration data according to the embodiment of FIG. 23.

Referring to FIG. 25, a high SNR can be secured at a folding angle (e.g., a folding angle of 0°) corresponding to stored reference data. In addition, a relatively high SNR of a certain level or higher can be ensured for the other folding angles.

FIG. 26 is a block diagram illustrating a fingerprint detection and authentication method according to an embodiment of the present invention. Compared with the embodiment of FIG. 6, the embodiment of FIG. 26 may further include a touch position detection operation ST112, a folding angle detection operation ST114, and a calibration data generation operation ST134.

Hereinafter, the fingerprint detection and authentication method according to an embodiment of the present invention will be sequentially described with reference to FIGS. 1 to 26. For convenience of explanation, a further detailed description of components and technical aspects previously described with reference to FIGS. 6 and 19 may be omitted.

<ST112: Touch Position Detection Operation>

When a fingerprint event occurs, a touch position where a user's finger touches or approaches the display device DD for fingerprint authentication may be detected. For example, by using the touch sensor TS and the touch controller TSC of FIG. 5, a touch coordinate of a point where a user's finger touches or approaches may be detected.

In an embodiment, the touch position may be detected in the fingerprint sensing area FSA in the touch position detection operation ST112, and a user's fingerprint may be sensed by emitting light from at least some of the pixels PX disposed in the fingerprint sensing area FSA. In an embodiment, the user's fingerprint may be sensed by emitting light from at least some of the pixels PX disposed in the fixed fingerprint sensing area FSA irrespective of the detected touch position (ST120 and ST130).

In an embodiment, when the fingerprint sensing area FSA is set to be fixed, the touch position detection operation ST112 may be omitted.

<ST114: Folding Angle Detection Operation>

When the fingerprint event occurs, the folding angle of the display device DD may be detected. In an embodiment, the folding angle of the display device DD may be sensed by using the touch sensor TS of FIG. 5. In an embodiment, the folding angle of the display device DD may be sensed by using a folding sensor separate from the touch sensor TS.

The detection of the folding angle may be performed by a touch controller TSC and/or a sensor controller PSC (e.g., a movement amount detector MDT including a folding angle detector FAD as described with reference to FIG. 18B). In this case, the touch controller TSC and/or the sensor controller PSC may detect the folding angle of the display device DD based on an electrical signal input from the touch sensor TS. To this end, the touch controller TSC and/or the sensor controller PSC may include a folding angle detector (e.g., FAD of FIG. 18B).

<ST134: Calibration Data Generation Operation>

After detection of the folding angle, calibration data corresponding to the folding angle may be generated. According to an embodiment, the calibration data generation operation ST134 may be performed by the calculator OP according to the embodiments of FIGS. 18A and 18B. However, the present invention is not limited thereto.

In an embodiment, information (e.g., the difference in the movement amount between the pinhole optical system and the optical sensor PHS) on misalignment between the pinhole optical system and the optical sensor PHS for each folding angle with reference to the memory MR may be extracted or calculated, and the positions of the pinholes PIH may be corrected (e.g., shifted) in the reference data stored in the memory MR according to the movement amount of the optical sensor PHS, thereby generating new calibration data. To this end, in the manufacturing step of the display device DD, with respect to at least one folding angle (also referred to as a "reference folding angle"), the difference in the movement amount between the pinhole optical system and the optical sensor PHS, and/or the offset value to be used to correct the calibration data may be stored in the memory MR. That is, in the manufacturing step of the display device DD, the difference (e.g., a slip distance of the display panel DP and/or the pinhole optical system) in the movement amount between the pinhole optical system and the optical sensor PHS for each reference folding angle may be converted into data (or be numbered) in the form of the offset value and may be stored in the memory MR.

When the fingerprint event occurs while using the display device DD, reference data may be corrected using the offset value, thereby generating calibration data. For example, an offset value for any one reference folding angle closest to the folding angle sensed (or matching the folding angle sensed) in the folding angle detection operation ST114 may be selected, and the positions of the pinholes PIH in the reference data may be corrected by applying the offset value, thereby generating the calibration data. Alternatively, a new offset value may be calculated by interpolating offset values for two reference folding angles similar to the folding angle sensed in the folding angle detection operation ST114, and the positions of pinholes PIH in the reference data may be corrected by applying the calculated offset value, thereby generating the calibration data. In this case, calibration data may be generated by assigning a weight according to a deviation between the sensed folding angle and each selected reference folding angle.

The calibration data can be generated in various ways. For example, in an embodiment, the calibration data may be generated by selecting one of reference data for a plurality of reference folding angles according to a folding angle and/or a range thereof, or by interpolating two pieces of reference data.

After the calibration data is generated, the fingerprint sensing data correction operation ST140 and the fingerprint authentication operation ST150 using the calibration data may be sequentially performed.

FIG. 27 is a plan view illustrating a touch sensor TS according to an embodiment of the present invention. According to an embodiment, in FIG. 27, a mutual capacitance type touch sensor TS is described as an example. However, the present invention is not limited thereto. For example, the touch sensor TS may be a touch sensor of various structures and/or types.

Referring to FIGS. 1 to 27, the touch sensor TS may include touch electrodes TSE provided in the touch sensing area TSA. In an embodiment, the touch electrodes TSE may include first touch electrodes TSE1 and second touch electrodes TSE2 arranged in different directions.

The first touch electrodes TSE1 may be sequentially arranged in the first direction DR1, and each thereof may extend in the second direction DR2. The second touch electrodes TSE2 may be sequentially arranged in the second direction DR2, and each thereof may extend in the first direction DR1.

When the touch sensor TS is a mutual capacitive touch sensor, one of the first touch electrodes TSE1 and the second touch electrodes TSE2 may be driving electrodes, and the other thereof may be sensing electrodes. For example, the first touch electrodes TSE1 may be driving electrodes, and the second touch electrodes TSE2 may be sensing electrodes.

In an embodiment, the touch electrodes TSE may also be used to calculate a folding angle of the display device DD. For example, when the fingerprint event occurs, the folding angle of the display device DD may be sensed using at least some of the touch electrodes TSE.

For example, when the touch sensor TS (and/or the display device DD including the same) includes the first flat area FLA1 and the second flat area FLA2 disposed on both sides of the folding area FDA, at least one touch electrode TSE disposed in the first flat area FLA1 may be used as a driving electrode for folding sensing, and at least one other touch electrode TSE disposed in the second flat area FLA2 may be used as a sensing electrode for folding sensing. Alternatively, at least one touch electrode TSE disposed in the first flat area FLA1 may be used as a sensing electrode for folding sensing, and at least one other touch electrode TSE disposed in the second flat area FLA2 may be used as a driving electrode for folding sensing.

For example, by using at least one first touch electrode TSE1-1 disposed in the first flat area FLA1 as a driving electrode, and using at least one first touch electrode TSE1-2 disposed in the second flat area FLA2 as a sensing electrode, the folding angle of the display device DD may be sensed. In this case, the display device DD may further include a switching unit for connecting the first touch electrode(s) TSE1-1 of the first flat area FLA1 to the scan driver (or a driving circuit) of the touch controller TSC during the fingerprint detection period (or folding detection period), and for connecting the first touch electrode(s) TSE1-2 of the second flat area FLA2 to the readout driver (or a sensing circuit) of the touch controller TSC.

Figure 28A:
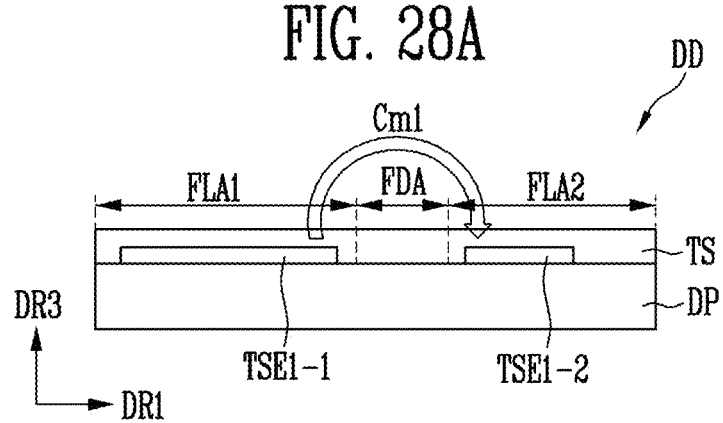
FIGS. 28A and 28B are cross-sectional views schematically illustrating a change in capacitance between touch electrodes due to a folding of a display device including the touch sensor of FIG. 27.
Figure 28B:
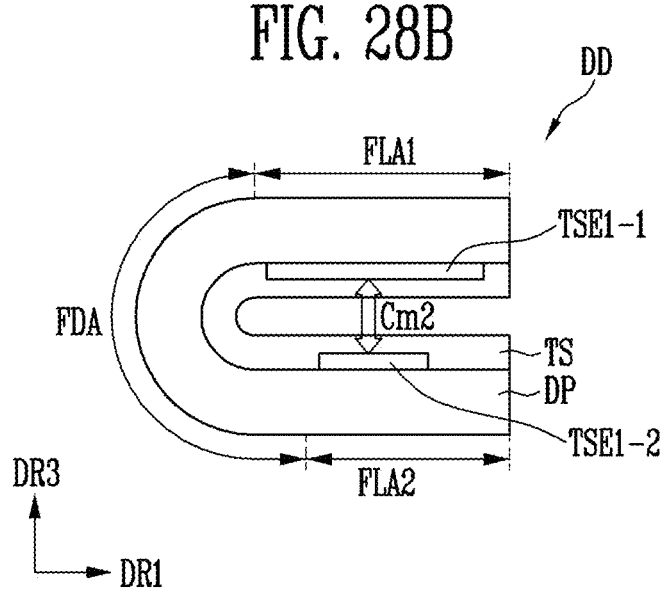

FIGS. 28A and 28B are cross-sectional views schematically illustrating a change in capacitance between touch electrodes TSE due to a folding of a display device DD including the touch sensor TS of FIG. 27.

Referring to FIGS. 1 to 28B, when the display device DD is unfolded as shown in FIG. 28A, a first capacitance Cm1 may occur between the first touch electrode(s) TSE1-1 of the first flat area FLA1 and the first touch electrode(s) TSE1-2 of the second flat area FLA2.

When the display device DD is folded or bent, a distance between the first touch electrode(s) TSE1-1 of the first flat area FLA1 and the first touch electrode(s) TSE1-2 of the second flat area FLA2 changes, and thus, the capacitance therebetween may change. For example, when the display device DD is folded as shown in FIG. 28B, the distance between the first touch electrode(s) TSE1-1 of the first flat area FLA1 and the first touch electrode(s) TSE1-2 of the second flat area FLA2 decreases, and thus, a second capacitance Cm2 greater than the first capacitance Cm1 may occur therebetween.

That is, the size of the capacitance detected by the touch sensor TS may change according to the folding angle. Therefore, by sensing the size of the capacitance, the folding angle of the display device DD can be detected. For example, the folding angle detector FAD may detect the folding angle of the display device DD by sensing the size of the capacitance based on electrical signals output from the touch sensor TS when detecting the fingerprint.

In the embodiments of FIGS. 27, 28A and 28B, the folding angle of the display device DD is detected using the touch sensor TS. However, the present invention is not limited thereto. For example, in an embodiment, a folding sensor separate from the touch sensor TS may be utilized, and the folding angle of the display device DD may be detected using the folding sensor. In an embodiment, the folding sensor may include a first electrode disposed in the first flat area FLA1 and a second electrode disposed in the second flat area FLA2 and spaced apart from the first electrode, and may output an electrical signal corresponding to a mutual capacitance between the first and second electrodes.

FIG. 29 illustrates a method of selecting calibration data according to an embodiment of the present invention. For example, FIG. 29 illustrates an embodiment for a method selecting one of the pieces of reference data stored in the memory MR as calibration data, or a method used for generation of calibration data by the sensor controller PSC (e.g., the calculator OP) of FIGS. 18A and 18B.

Referring to FIGS. 26 to 29, reference data for a plurality of folding angles (e.g., reference folding angles) may be stored in the memory MR in a manufacturing step of the display device DD. In addition, at least one piece of reference data may be selected according to the folding angle detected in the folding angle detection operation ST114, and calibration data may be generated using the selected reference data.

In an embodiment, the reference data for any one folding angle may be selected as the calibration data according to the folding angle detected in the folding angle detection operation ST114. For example, the reference data preset (e.g., stored in the form of a lookup table as shown in FIG. 29) according to the detected folding angle and/or a range thereof may be selected as the calibration data. Alternatively, the reference data corresponding to the folding angle closest to the folding angle may be selected as the calibration data. The selected calibration data may be used to correct the fingerprint sensing data.

In an embodiment, the reference data for two folding angles similar to the folding angle detected in the folding angle detection operation ST114 may be selected, and the calibration data may be generated by interpolating the selected two pieces of reference data. For example, the calibration data may be generated by adding a weight according to similarity to the detected folding angle, and by summing the two pieces of reference data. The generated calibration data may be used to correct the fingerprint sensing data.

FIG. 29 illustrates calibration data selected only for some of the folding angle range. However, the present invention is not limited thereto. For example, the calibration data may be selected in a similar manner for the other folding angles, and a folding angle range and/or a corresponding selection value of calibration data may be variously changed. In addition, for a folding angle corresponding to a boundary of each folding angle range, a predetermined standard may be prepared and the calibration data may be selected. For example, when the folding angle is detected as 45°, calibration data corresponding to 60° of the folding angle may be selected.

FIG. 30 illustrates a method of setting an offset value of calibration data according to an embodiment of the present invention. For example, FIG. 30 illustrates an embodiment for a method of setting an offset value to be used for generation of the calibration data by the sensor controller PSC (e.g., the calculator OP) of FIGS. 18A and 18B.

Referring to FIGS. 26 to 30, the calibration data may be generated by correcting reference data stored in the memory MR by applying a predetermined offset value according to the folding angle detected in the folding angle detection operation ST114. For example, the calibration data may be generated by correcting (e.g., shifting) the positions of the pinholes PIH in the reference data by an offset value preset according to the detected folding angle and/or the range thereof (e.g., stored in the form of a lookup table as shown in FIG. 30). FIG. 30 illustrates the offset value for reference folding angles, and the offset value may be variously changed.

To this end, in a manufacturing step of the display device DD, the offset value to be used for correcting reference data for at least one folding angle (e.g., a reference folding angle) may be stored in the memory MR. That is, in the manufacturing stage of the display device DD, the difference (e.g., the slip distance of the display panel DP and/or the pinhole optical system) in the movement amount between the pinhole optical system and the optical sensor PHS for each reference folding angle may be converted into data is in the form of the offset value, and may be stored in the memory MR.

According to an embodiment, as the folding angle of the display device DD increases (as a folding degree increases), the movement amount of the optical sensor PHS may increase. Accordingly, as the folding angle of the display device DD increases, the offset value may increase, thereby compensating for misalignment due to the difference in the movement amount of the pinhole optical system and the optical sensor PHS.

In an embodiment, the offset value may be set to increase linearly with each folding angle. In an embodiment, the offset value may be set to increase non-linearly with each folding angle.

When the fingerprint event occurs while using the display device DD, reference data may be corrected using the offset value, thereby generating calibration data. For example, an offset value for any one reference folding angle closest to the folding angle sensed (or matching the folding angle sensed) in the folding angle detection operation ST114 may be extracted from the memory MR, and the positions of the pinholes PIH in the reference data may be corrected by applying the offset value. As a result, the calibration data may be generated. Alternatively, a new offset value may be calculated by interpolating two offset values for two reference folding angles similar to the folding angle sensed in the folding angle detection operation ST114, and the reference data may be corrected by applying the calculated offset value. As a result, the calibration data may be generated. For example, the calibration data may be generated by correcting the positions of pinholes PIH in the reference data according to the interpolated two offset values. The generated calibration data may be used to correct the fingerprint sensing data.

According to the above-described embodiments, when detecting a user's fingerprint, misalignment information indicating a degree of misalignment between the pinhole optical system and the optical sensor PHS (e.g., the difference in the movement amount between the pinhole optical system and the optical sensor PHS, the positional deviation or the offset value of the pinholes PIH between the fingerprint sensing data and the reference data, and/or the folding angle of the display device DD) may be detected, and the new calibration data may be generated from at least one piece of reference data (e.g., at least one piece of reference data corresponding to at least one reference folding angle) based on the detected information.

Accordingly, noise included in the fingerprint sensing data can be effectively removed. For example, in the display device DD that detects fingerprints using a pinhole optical system embedded in the display panel DP according to embodiments of the present invention, noise can be effectively removed and the SNR can be improved even when the pinhole optical system and the optical sensor PHS is misaligned due to, for example, folding, bending, etc. Accordingly, the fingerprint authentication performance of the display device DD can be improved.

As is traditional in the field of the present invention, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present invention has been particularly shown and described with reference to the embodiments thereof, it will be understood by those of ordinary skill in the art that various changes in form and detail may be made therein without departing from the spirit and scope of the present invention as defined by the following claims.

What is claimed is:

1. A fingerprint detection method, comprising:
    obtaining fingerprint sensing data by sensing a user's fingerprint using a display device including a display panel including a pinhole optical system and an optical sensor overlapping the pinhole optical system;
    detecting misalignment information indicating a degree of misalignment between the pinhole optical system and the optical sensor caused by folding the display device;
    generating calibration data using at least one piece of reference data corresponding to at least one reference folding angle according to the detected misalignment information,
    wherein the at least one piece of reference data is one of a plurality of pieces of reference data, and the pieces of reference data correspond to different reference folding angles,
    wherein when none of the pieces of reference data correspond to a reference folding angle that matches a current folding angle of the display device, the calibration data is generated using a piece of reference data corresponding to a reference folding angle that is closest to the current folding angle;
    generating fingerprint data by correcting the fingerprint sensing data using the calibration data; and
    detecting the user's fingerprint according to the fingerprint data.

2. The fingerprint detection method of claim 1, wherein detecting the misalignment information comprises:
    detecting position information of a plurality of pinholes included in the pinhole optical system using the fingerprint sensing data; and
    detecting a difference in a movement amount between the pinhole optical system and the optical sensor by comparing the position information of the pinholes with the at least one piece of reference data.

3. The fingerprint detection method of claim 2, wherein generating the calibration data comprises:
    selecting two pieces of reference data having a high degree of similarity from a plurality of pieces of reference data by comparing the position information of the pinholes with the plurality of pieces of reference data; and
    generating the calibration data by interpolating the two pieces of reference data.

4. The fingerprint detection method of claim 3, wherein interpolating the two pieces of reference data comprises:
    setting an offset value for each of the two pieces of reference data by comparing the position information of the pinholes with extracted position information of the pinholes extracted from the two pieces of reference data;
    assigning a weight to each of the two pieces of reference data according to an offset value for each of the two pieces of reference data; and
    summing the two weighted pieces of reference data.

5. The fingerprint detection method of claim 4, wherein the offset value for each of the two pieces of reference data is a correction value set to match positions of the pinholes in each of the two pieces of reference data with detected positions of the pinholes.

6. The fingerprint detection method of claim 2, wherein generating the calibration data comprises:
    setting an offset value for a single piece of reference data by comparing the position information of the pinholes with extracted position information of pinholes extracted from the single piece of reference data; and
    generating the calibration data by correcting the single piece of reference data according to the offset value.

7. The fingerprint detection method of claim 6, wherein the offset value is a correction value set to match positions of the pinholes in the single piece of reference data with detected positions of the pinholes.

8. The fingerprint detection method of claim 1, wherein detecting the misalignment information comprises detecting a folding angle of the display device.

9. The fingerprint detection method of claim 8, wherein detecting the folding angle of the display device comprises detecting the folding angle using a sensing signal output from a touch sensor.

10. The fingerprint detection method of claim 8, wherein generating the calibration data comprises selecting one piece of reference data as the calibration data corresponding to the detected folding angle.

11. The fingerprint detection method of claim 8, wherein generating the calibration data comprises:

selecting two pieces of reference data corresponding to two reference folding angles similar to the detected folding angle; and generating the calibration data by interpolating the two pieces of reference data.

12. The fingerprint detection method of claim 8, wherein generating the calibration data comprises:

extracting an offset value corresponding to the detected folding angle; and generating the calibration data by correcting the at least one piece of reference data according to the offset value.

13. The fingerprint detection method of claim 8, wherein generating the calibration data comprises:

interpolating two offset values for two reference folding angles similar to the detected folding angle; and generating the calibration data by correcting the at least one piece of reference data according to the interpolated two offset values.

14. A display device, comprising:

a display panel including a pinhole optical system;

an optical sensor overlapping the pinhole optical system;

a memory that stores at least one piece of reference data corresponding to at least one reference folding angle, wherein the at least one piece of reference data is one of a plurality of pieces of reference data, and the pieces of reference data correspond to different reference folding angles; and a sensor controller that detects misalignment information indicating a degree of misalignment between the pinhole optical system and the optical sensor caused by folding the display device, and that corrects fingerprint sensing data according to the detected misalignment information and the at least one piece of reference data, wherein when none of the pieces of reference data correspond to a reference folding angle that matches a current folding angle of the display device, the sensor controller corrects the fingerprint sensing data according to the detected misalignment information and a piece of reference data corresponding to a reference folding angle that is closest to the current folding angle.

15. The display device of claim 14, wherein the sensor controller comprises:

a fingerprint sensing data generator that generates the fingerprint sensing data using electrical signals from the optical sensor;

a movement amount detector that detects the misalignment information;

a calculator that generates calibration data corresponding to the detected misalignment information; and an image processor that corrects the fingerprint sensing data using the calibration data.

16. The display device of claim 15, wherein the calculator selects at least one piece of reference data stored in the memory corresponding to the detected misalignment information, and generates the calibration data using the selected at least one piece of reference data.

17. The display device of claim 15, wherein the calculator generates the calibration data by correcting at least one piece of reference data stored in the memory according to an offset value corresponding to the detected misalignment information.

18. The display device of claim 14, wherein the display panel comprises a folding area having flexibility, and a first flat area and a second flat area disposed on opposite sides of the folding area.

19. The display device of claim 18, further comprising:

a touch sensor including at least one touch electrode disposed in the first flat area and at least one touch electrode disposed in the second flat area.

20. The display device of claim 19, further comprising:

a folding angle detector that detects a folding angle from an output signal of the touch sensor, wherein the sensor controller corrects the fingerprint sensing data according to the detected folding angle.

\* \* \* \* \*